US009838555B2

(12) United States Patent
Ujike

(10) Patent No.: US 9,838,555 B2
(45) Date of Patent: Dec. 5, 2017

(54) IMAGE FORMING APPARATUS, IMAGE FORMING SYSTEM, AND IMAGE FORMATION CONTROL METHOD WITH IMAGE DETERIORATION PREVENTION DURING IMAGE READING

(71) Applicant: Konica Minolta, Inc., Tokyo (JP)

(72) Inventor: Hiroyuki Ujike, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/939,645

(22) Filed: Nov. 12, 2015

(65) Prior Publication Data
US 2016/0134771 A1    May 12, 2016

(30) Foreign Application Priority Data
Nov. 12, 2014 (JP) ................................ 2014-229920

(51) Int. Cl.
*H04N 1/00* (2006.01)
(52) U.S. Cl.
CPC ....... *H04N 1/00814* (2013.01); *H04N 1/0032* (2013.01); *H04N 1/00925* (2013.01); *H04N 1/00933* (2013.01)
(58) Field of Classification Search
CPC ............. H04N 1/00814; H04N 1/0032; H04N 1/00925; H04N 1/00933
See application file for complete search history.

(56) References Cited

U.S. PATENT DOCUMENTS

2007/0081202 A1*  4/2007  Miyamoto ......... H04N 1/00933
                                                                358/496

FOREIGN PATENT DOCUMENTS

JP    2005-078458 A    3/2005
JP    2005-079613 A    3/2005

* cited by examiner

*Primary Examiner* — Iriana Cruz
(74) *Attorney, Agent, or Firm* — Osha Liang LLP

(57) ABSTRACT

An image forming system includes an image former; a reader that executes reading a document or a sheet; a post processor that applies post processing to the document or the sheet; and a controller. The controller controls the image formation, the reading and the post processing, judges the requested degree of importance of reading for a reading target on the document or the sheet, judges existence or nonexistence of an overlap between an execution timing of the reading and a timing of generation of vibration at the post processing, judges the necessity of a countermeasure to prevent the overlap from occurring with reference to the degree of importance of reading and the existence or nonexistence of the overlap, and controls the execution timing of the reading and the post processing to prevent the overlap from occurring when the controller determines that the countermeasure is necessary.

11 Claims, 16 Drawing Sheets

GENERATION OF VIBRATION

Fig. 14

|  |  | READING TIMING AND POST PROCESSING TIMING | |
|---|---|---|---|
|  |  | OVERLAP | NOT OVERLAP |
| REQUESTED DEGREE OF IMPORTANCE OF READING | HIGH | NECESSARY | UNNECESSARY |
|  | MID | NECESSARY | UNNECESSARY |
|  | LOW | UNNECESSARY | UNNECESSARY |

Fig. 15

|  |  | READING TIMING AND POST PROCESSING TIMING | | | |
|---|---|---|---|---|---|
|  |  | OVERLAP | | | NOT OVERLAP |
|  |  | DEGREE OF INFLUENCE OF VIBRATION | | | |
|  |  | LARGE | MID | SMALL | |
| REQUESTED DEGREE OF IMPORTANCE OF READING | HIGH | NECESSARY | NECESSARY | NECESSARY | UNNECESSARY |
|  | MID | NECESSARY | NECESSARY | UNNECESSARY | UNNECESSARY |
|  | LOW | UNNECESSARY | UNNECESSARY | UNNECESSARY | UNNECESSARY |

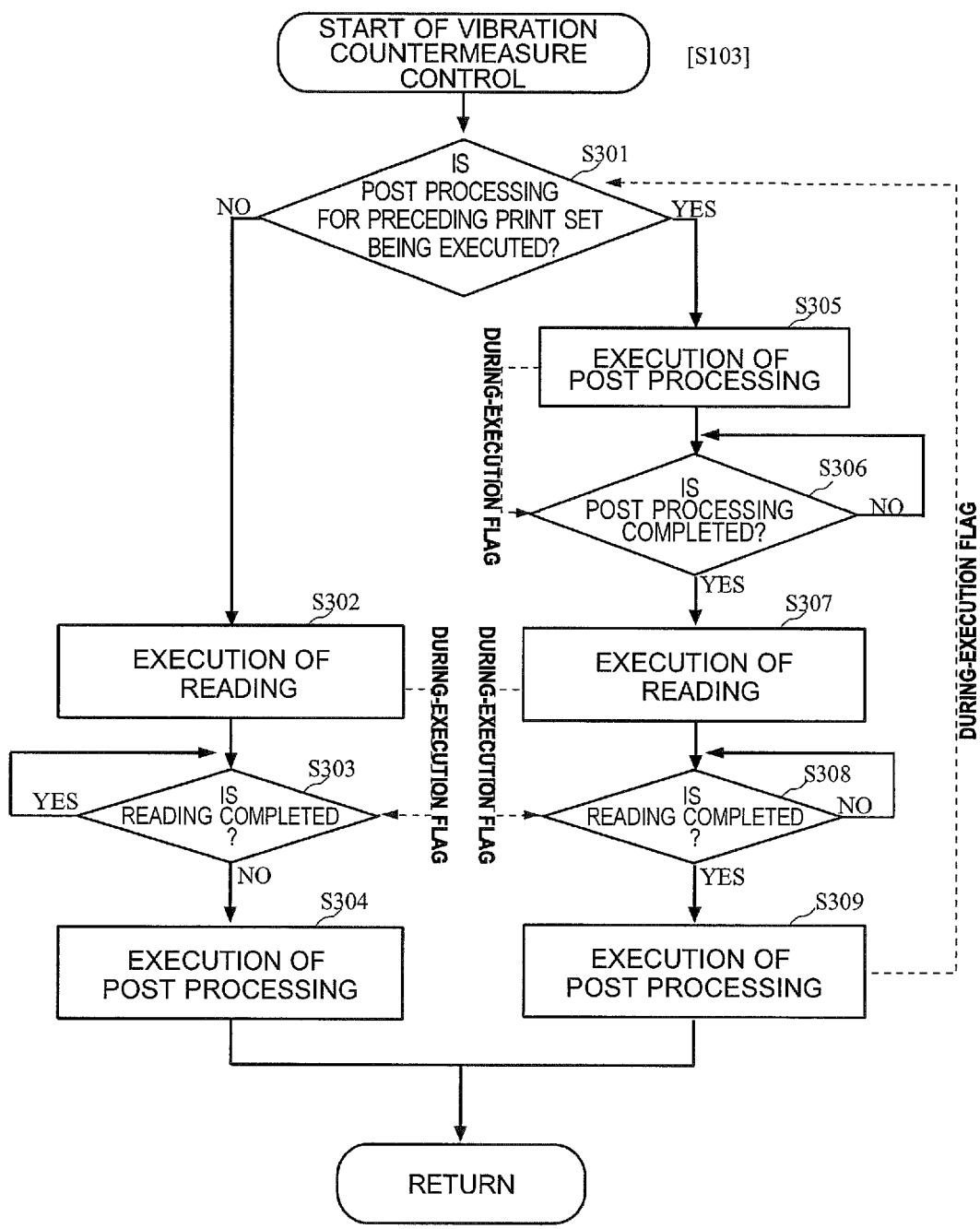

IMAGE FORMING APPARATUS, IMAGE FORMING SYSTEM, AND IMAGE FORMATION CONTROL METHOD WITH IMAGE DETERIORATION PREVENTION DURING IMAGE READING

The present application claims the priority under the Paris Convention based on Japanese Patent Application No. 2014-229920 filed on Nov. 12, 2014, in accordance with the provisions in Article 119 in the United States Patent Law.

BACKGROUND OF THE INVENTION

Technical Field

The present invention relates to an image forming apparatus, image forming system, and image formation control method in which a document can be read without being influenced by vibration that occurs in post processing.

Background Art

There exists an image forming system in which a reading apparatus (output matter reading apparatus) is connected to the subsequent stage of an image forming apparatus which forms an image on a sheet and the reading apparatus is configured to read an image on a sheet subjected to image formation. Similarly, there exists an image forming apparatus in which a reading section (output matter reading section) is disposed on the downstream side of an image forming section which forms an image on a sheet and the reading section is configured to read an image on a sheet subjected to image formation.

In such an image forming apparatus and an image forming system, a reading result after image formation is referred and used for purposes, such as adjustment of an image formation position or image quality, detection of an image formation failure sheet, and evidence preservation of an image formation result (an image for evidence identification).

Incidentally, in such an image forming apparatus and an image forming system, vibration occurs at the time of a stapling operation in a post processing apparatus and at the time of switching sheet stackers. Successively, the vibration in the post processing apparatus is transmitted to an image reading section, and the image reading section shakes by the vibration, causing a read image to deteriorate. Then, in order to prevent the influence of vibration, during execution of post processing, such as stapling, reading of an image in an image reading section is interrupted. Thereby, it becomes possible to prevent a read image from deteriorating. On the other hand, during reading of an image in an image reading section, post processing, such as stapling, is interrupted. Thereby, it becomes possible to prevent a read image from deteriorating.

As this kind of a technique, relevant proposals have been made by a known document 1 (Japanese Unexamined Patent Publication No. 2005-79613) and a known document 2 (Japanese Unexamined Patent Publication No. 2005-78458). In the above known document 1, vibration at the time of a stapling operation is transmitted to an image reading section and the image reading section shakes by the vibration. Thereby, a read image deteriorates. Accordingly, during execution of post processing, such as stapling, reading of a document image in an image reading section is interrupted. Thereby, a read image is prevented from deteriorating.

Further, in the above known document 2, in an image forming apparatus which has a print output apparatus on each of an inside and an outside, when a printing operation for image data is being executed by using the internal printing apparatus, due to reasons such as a reason that vibration caused by a printing operation provides a bad influence to a reading operation for image data, operation of an image reading section is inhibited. On the other hand, during operation of the internal printing apparatus, upon receipt of an instruction to read image data by using an external printing apparatus on an interruption mode, an operation of the internal printing apparatus is stopped. Then, reading of image data is started, and it makes it possible to output the external printing apparatus.

SUMMARY

As described in the above, during reading of an image in an image reading apparatus, a read image deteriorates by vibration in a post processing operation. Then, in order to avoid deterioration of an image, there exists a technique to interrupt evenly a post processing operation during reading or a reading operation during operation of post processing. According to such a technique to interrupt evenly, with regard to an image in which deterioration of a read image is not important and an image in which vibration caused by post processing does not overlap with a timing of reading, the productivity lowers evenly. Further, in the case where reading and post processing occur frequently, interruption occurs frequently, which results in that productivity also lowers greatly.

One or more embodiments of the present invention enable post processing and reading to be efficiently executed in an image forming apparatus and an image forming system that are equipped with a post processing apparatus and a reading section.

One or more embodiment of the present invention bare listed as follow.

An image forming apparatus which reflects one aspect of one or more embodiments of the present invention includes: an image former that executes image formation for the document or the sheet; a reader that executes reading the document or the sheet and that connects to a post processor that applies post processing to the document or the sheet; and a controller.

The controller controls the image formation, the reading, and the post processing; judges a requested degree of importance of reading for a reading target on the document or the sheet, judges existence or nonexistence of an overlap between an execution timing of the reading and a timing of generation of vibration in the post processing, judges a necessity of a countermeasure to prevent the overlap from occurring with reference to the degree of importance of reading and the existence or nonexistence of the overlap, and controls reading and the post processing to prevent the overlap from occurring when the controller determines that the countermeasure is necessary.

Further, an image forming system which reflects one aspect of one or more embodiments of the present invention is constituted by connecting an image former that executes image formation for a document or a sheet; a reader that executes reading the document or the sheet; a post processor that applies post processing to the document or the sheet; and a controller that.

In the image forming system, the controller controls the image formation, the reading, and the post processing, judges the requested degree of importance of reading for a reading target on the document or the sheet, judges existence or nonexistence of an overlap between an execution timing of the reading and a timing of generation of vibration in the post processing, judges the necessity of a countermeasure to prevent the overlap from occurring with reference to the degree of importance of reading and the existence or nonexistence of the overlap, and controls the execution timing of the reading and the post processing to prevent the overlap from occurring when the controller determine that the countermeasure is necessary.

Further, an image formation control method which reflects one aspect of one or more embodiments of the present invention, is an image formation control method for a system including an image former to execute image formation for a document or a sheet, a reader to execute reading the document or the sheet, a post processor to apply post processing to the document or the sheet.

The image formation control method includes: controlling the image formation, the reading, and the post processing; judging a requested degree of importance of reading for a reading target on the document or the sheet; judging existence or nonexistence of an overlap between an execution timing of the reading and a timing of generation of vibration in the post processing; judging a necessity of a countermeasure to prevent the overlap from occurring with reference to the degree of importance of reading and the existence or nonexistence of the overlap; and controlling an execution timing of the reading and the post processing to prevent the overlap from occurring when there is the necessity of the countermeasure in the judging the necessity of the countermeasure.

In one or more embodiments described above, the controller judges whether a timing of reading a portion of the reading target on the document or the sheet by the reader and the timing of generating vibration in the post processing at the post processor overlap with each other or not, and when the overlap does not occur, the controller determines that there is not the necessity of the countermeasure.

In one or more embodiments described above, when the controller determines that the overlap exists, and the degree of importance of reading is higher than a predetermined value, the controller determines that there is the necessity of the countermeasure. When the controller determines that the overlap exists, and the degree of importance of reading is lower than the predetermined value, the controller determines that there is not the necessity of the countermeasure.

In one or more embodiments described above, when recognition or analysis of the reading at the reader is executed, the controller determines that the required degree of importance of reading is higher than the predetermined value.

In one or more embodiments described above, the controller sets the requested degree of importance of reading or changes setting of the requested degree of importance of reading.

In one or more embodiments described above, when the controller judges the necessity of the countermeasure to prevent the overlap from occurring, the controller refers a degree of influence of vibration between the post processor and the reader.

In one or more embodiments described above, as the countermeasure to prevent the overlap from occurring, the controller controls the post processing of the post processor so that the post processing is executed in a period other than the execution timing of the reading at the reader.

In one or more embodiments described above, as the countermeasure to prevent the overlap from occurring, the controller controls the reading of the reader so that the reading is executed in a period other than in a period of an execution timing of the post processing at the post processor.

In one or more embodiments described above, as the countermeasure to prevent the overlap from occurring, the controller controls the reading of the reader and the post processing of the post processor so that the post processing is executed after the reading has been completed.

In one or more embodiments described above, as the countermeasure to prevent the overlap from occurring, the controller controls the reading of the reader and the post processing of the post processor so that the reading is executed after the post processing has been completed.

BRIEF DESCRIPTION OF THE DRAWINGS

FIG. 14 is an explanatory drawing showing contents of a table referred in operation according to one or more embodiments of the present invention.

FIG. 15 is an explanatory drawing showing contents of a table referred in operation according to one or more embodiments of the present invention.

FIG. 16 is a flow chart showing operation according to one or more embodiments of the present invention.

DETAILED DESCRIPTION OF EMBODIMENTS

Hereinafter, with reference to drawings, description will be given in detail for one or more embodiments which realize efficiently execution of post processing which generates vibration and reading of a sheet in an image forming apparatus and an image forming system.

Figure 1:
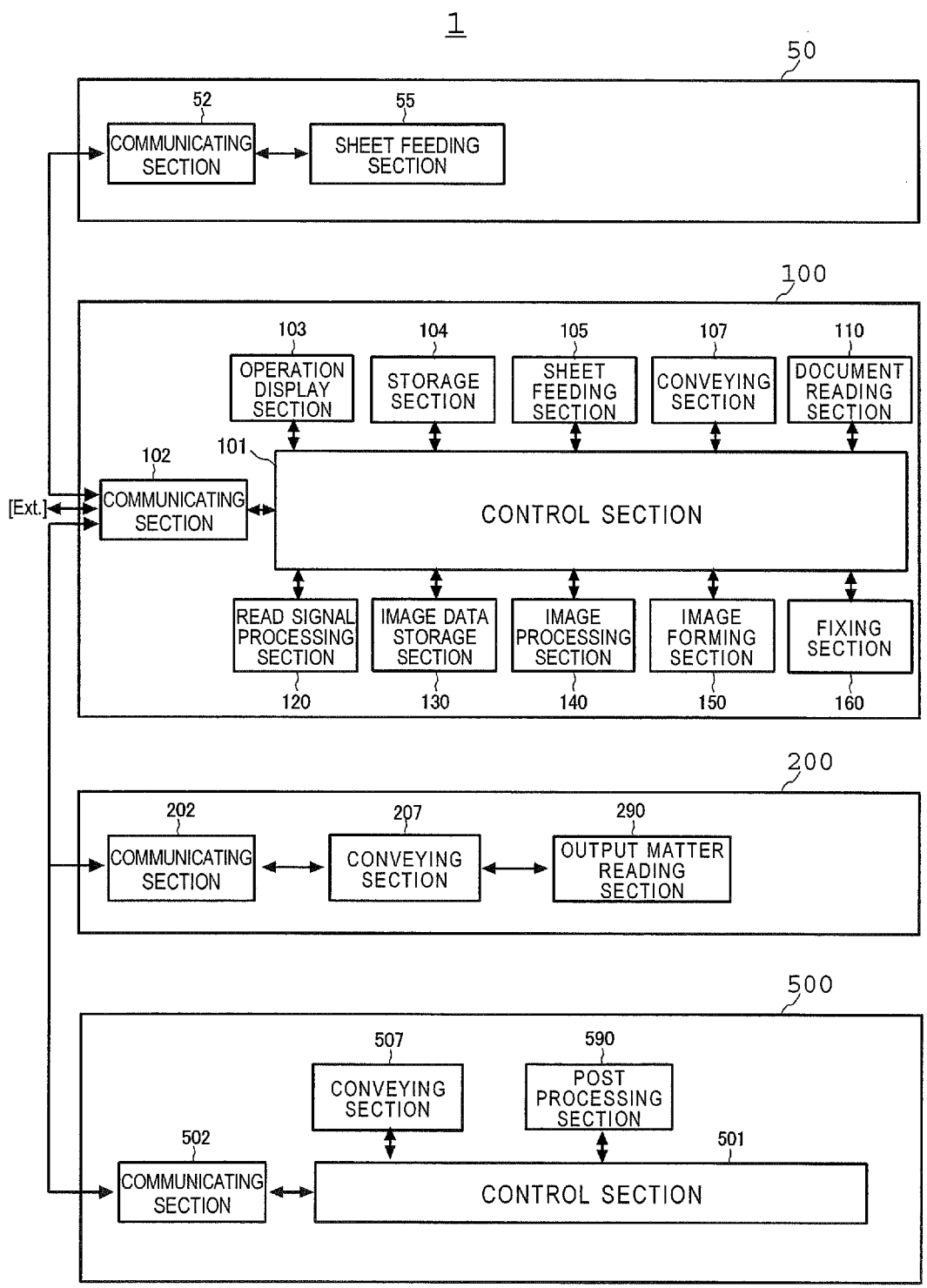
FIG. 1 is a constitution diagram showing a constitution of an image forming apparatus according to one or more embodiments of the present invention.
Figure 2:
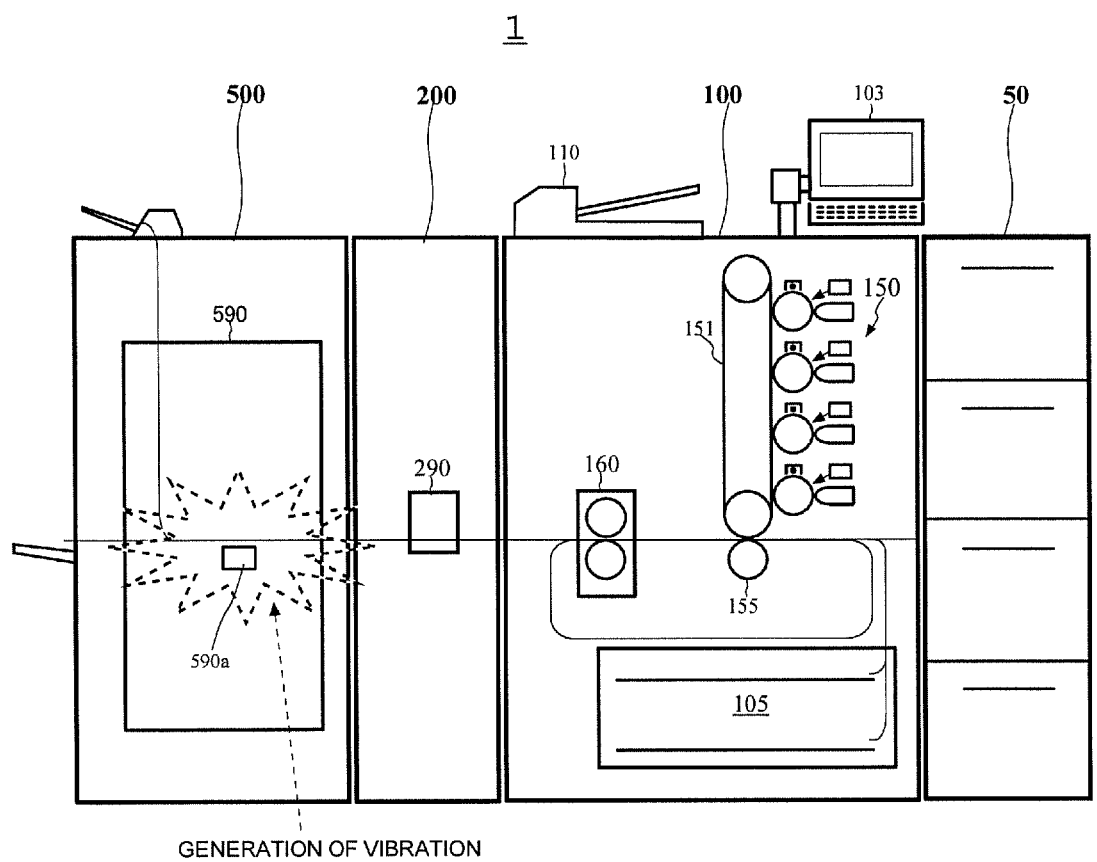
FIG. 2 is a constitution diagram showing a constitution of an image forming apparatus according to one or more embodiments of the present invention.

[A] Constitution of an Image Forming Apparatus and an Image Forming System:

Herein, based on FIG. 1 and FIG. 2, description is given in detail to an example of a constitution of an image forming apparatus according to one or more embodiments of the present invention. Further, based on FIG. 1 and FIG. 2, description is given in detail to an example of a constitution of an image forming system 1 in which a sheet feeding apparatus 50, an image forming apparatus 100, an output matter reading apparatus 200, and a post processing apparatus 500 are connected.

The sheet feeding apparatus 50 is constituted to include a communicating section 52 and a sheet feeding section 55. Herein, the communicating section 52 communicates with other connected apparatuses, such as the image forming apparatus 100. The sheet feeding section 55 feeds a sheet from accommodated sheets to the image forming apparatus 100.

The image forming apparatus 100 is constituted to include a control section 101 (may be referred to as "a controller"), a communicating section 102, an operation display section 103, a storage section 104, a sheet feeding section 105, a conveying section 107, a document reading section 110 (may be referred to as "a document reader" or merely "a reader"), a read signal processing section 120, an image data storage section 130, an image processing section 140, an image forming section 150 (may be referred to as "image former"), and a fixing section 160

The control section 101 controls each section in the image forming apparatus 100. The communicating section 102 communicates with other connected apparatuses (an external device, the sheet feeding apparatus 50, a sheet delivering apparatus 200, and the like). The operation display section 103 performs reception of an operational input by a user and a status display of the image forming apparatus 100. The storage section 104 stores various kinds of settings. The sheet feeding section 105 feeds a sheet from sheets accommodated in a sheet feed tray.

The conveying section 107 conveys a sheet within an apparatus. The document reading section 110 reads images of a document with an image sensor, and produces document image data. The read signal processing section 120 processes read signals acquired with the image sensor of each of the document reading section 110 and an output matter reading section mentioned later. The image data storage section 130 stores image data and various kinds of data at the time of performing image formation. The image processing section 140 executes various kinds of image processing necessary for image formation. The image forming section 150 forms an image on a sheet based on an image formation command and image data. The fixing section 160 stabilizes a toner image formed on a sheet with heat and pressure.

As mentioned later, the control section 101 judges the degree of importance of reading required for the reading of an image becoming a reading target; judges existence or nonexistence of an overlap between an execution timing of reading at the reading section and a timing of generation of vibration in post processing at the post processing section; judges the necessity of a countermeasure keep an overlap from occurring with reference to the degree of importance of reading and the existence or nonexistence of an overlap; and controls reading at the reading section and post processing at the post processing to keep an overlap from occurring correspondingly to the judged necessity.

Here, independently of the control section 101, a reading importance degree judging unit, a timing overlap judging unit, a vibration countermeasure necessity judging unit, and a vibration countermeasure control unit may exist separately.

The output matter reading apparatus 200 is constituted to include a communicating section 202, a conveying section 207, and an output matter reading section 290. The communicating section 202 communicates with other connected apparatuses, such as the image forming apparatus 100. The conveying section 207 conveys a sheet within an apparatus. The output matter reading section 290 reads an image formed on a sheet.

The post processing apparatus 500 is constituted to include a control section 501, a communicating section 502, a conveying section 507, and a post processing section 590 (may be referred to as "a post processor"). The control section 501 controls various operations of the post processing apparatus 500. The communicating section 502 communicates with other connected apparatuses, such as the image forming apparatus 100 and the output matter reading apparatus 200. The conveying section 507 conveys a sheet within an apparatus. The post processing section 590 applies various kinds of post processing, such as folding and binding, for a sheet and a sheet bundle which have been subjected to image formation.

In FIG. 2, in the post processing section 590, a portion to generate vibration (a broken line in FIG. 2) at the time of operation, such as a staple processing section, large stackers capable of being switched over, etc. is made schematically as a post processing section 590a. Herein, based on FIG. 3 and FIG. 4, description is given in detail to other example of a constitution of an image forming system according to one or more embodiments of the present invention.

Figure 3:
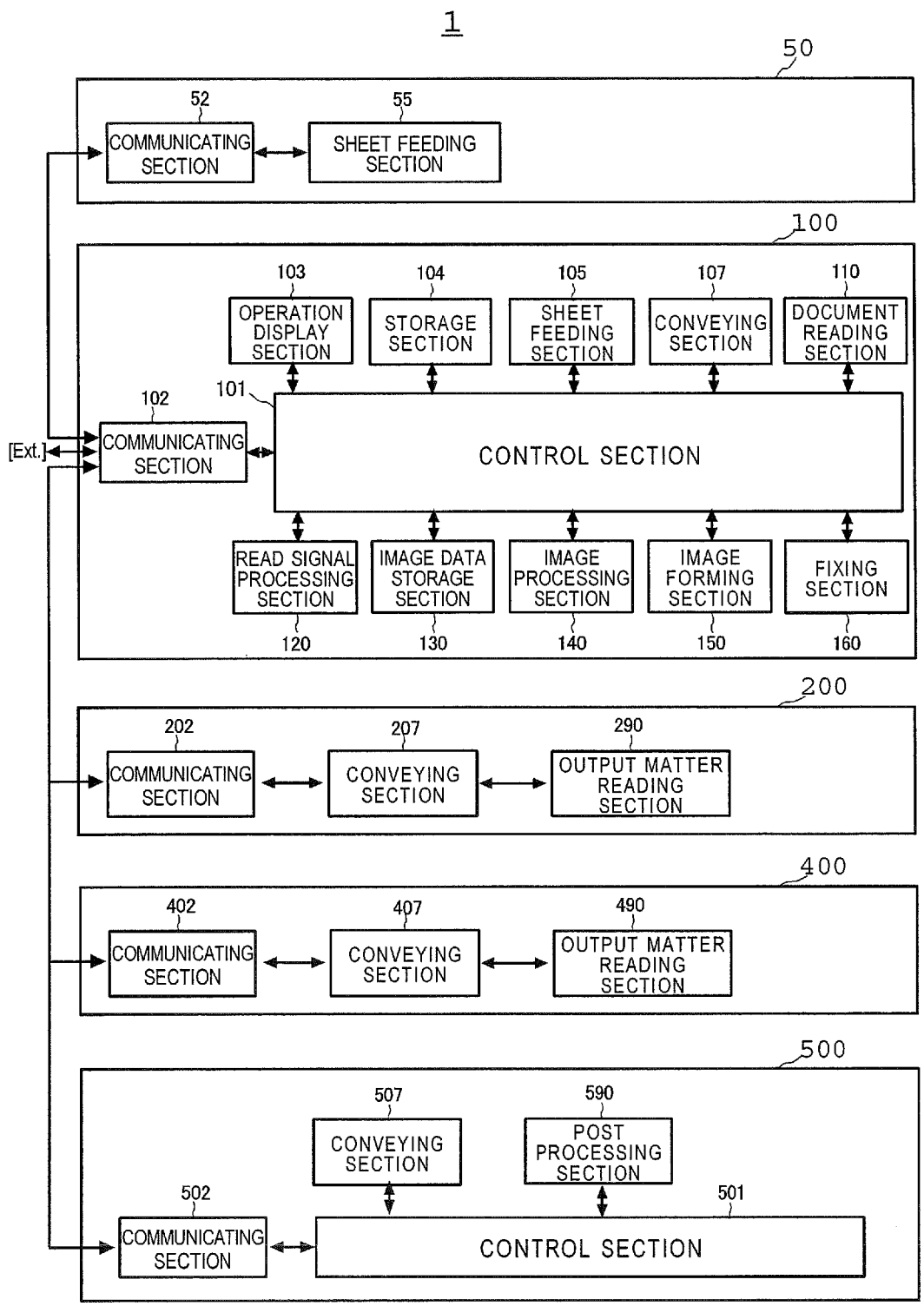
FIG. 3 is a constitution diagram showing a constitution of an image forming system according to one or more embodiments of the present invention.
Figure 4:
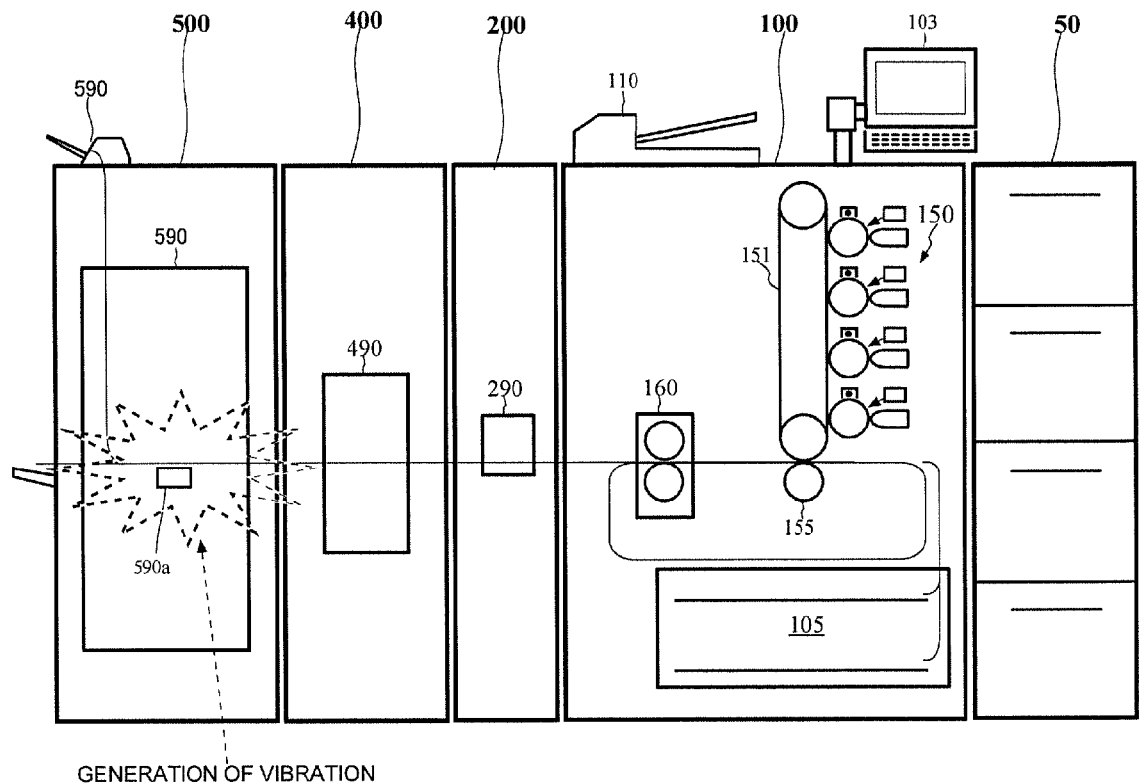
FIG. 4 is a constitution diagram showing a constitution of an image forming system according to one or more embodiments of the present invention.

FIG. 3 and FIG. 4 show an example of a constitution of an image forming system in which the sheet feeding apparatus 50, the image forming apparatus 100, the output matter reading apparatus 200, an intermediate processing apparatus 400, and the post processing apparatus 500 are connected. In FIGS. 1 and 2 and FIGS. 3 and 4, the same number is given to the same component, and a duplicate explanation is omitted.

The intermediate processing apparatus 400 is located at a middle position between the output matter reading apparatus 200 and the post processing apparatus 500, and is constituted to include a communicating section 402, a conveying section 407, and an intermediate processing section 490. The communicating section 402 communicates with other connected apparatuses, such as the image forming apparatus 100 and the output matter reading apparatus 200.

The conveying section 407 conveys a sheet within an apparatus. The intermediate processing section 490 executes various kinds of processing, such as sheet reversing and conveying timing adjustment, as a preliminary process of the post processing, for a sheet and a sheet bundle which have been subjected to image formation.

In the image forming system with the constitution of FIG. 3 and FIG. 4, a vibration amplitude from the post processing section 590 may change before the vibration reaches the output matter reading section 290, depending on the size and rigidity of the intermediate processing apparatus 400. That is, vibration generated at the post processing section 590 may attenuate at the time of passing the intermediate processing apparatus 400, and may become a small amplitude in the output matter reading section 290.

[B] Operation of an Image Forming Apparatus and an Image Forming System

Figure 5:
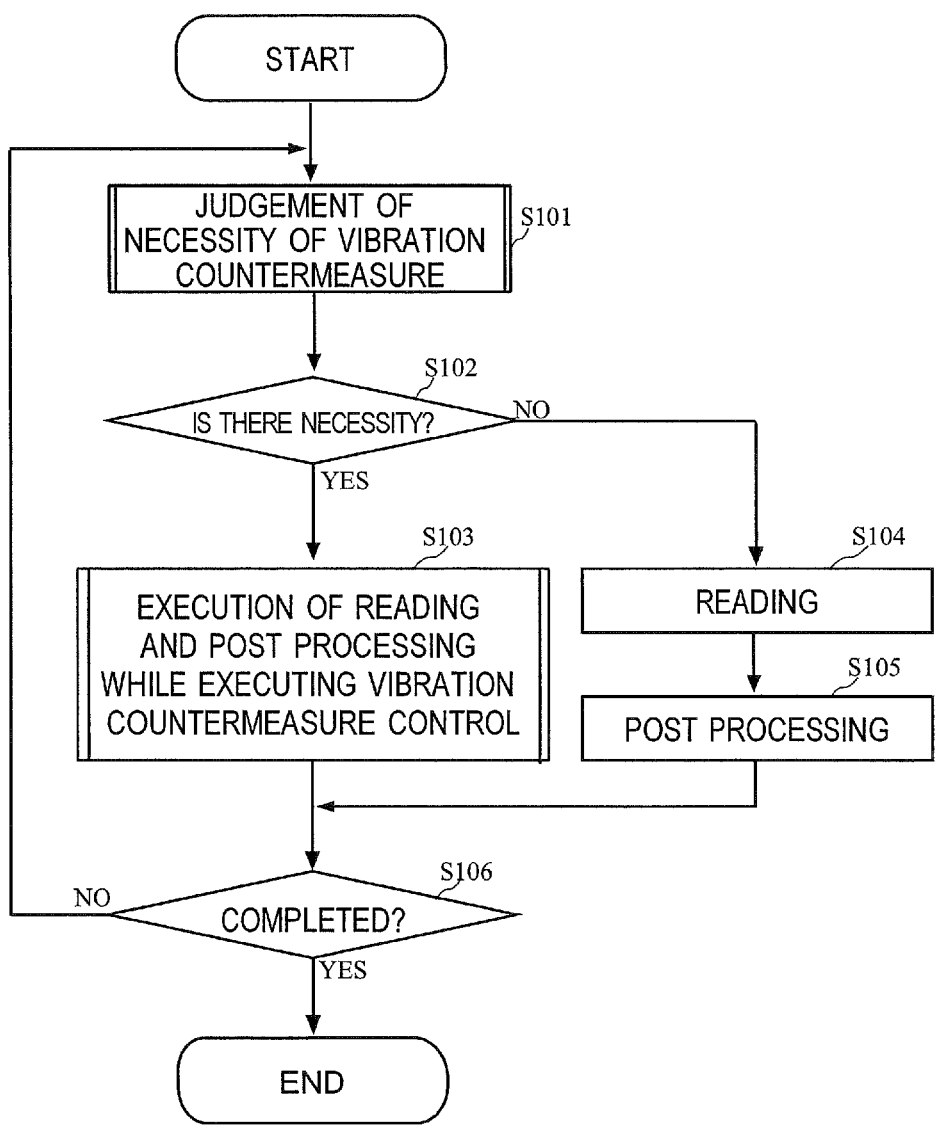
FIG. 5 is a flow chart showing operation according to one or more embodiments of the present invention.

Hereafter, description is given to basic operation portions of an example of operation of an image forming apparatus and an image forming system with reference to flow charts shown in FIG. 5 and the following drawings.

The control section 101 judges the necessity of a vibration countermeasure when the image forming apparatus 100 starts an image formation job (Step S101 in FIG. 5). Hereafter, with reference to a flow chart shown in FIG. 6, description is given to this vibration countermeasure necessity judgment (Step S101 in FIG. 5).

Figure 6:
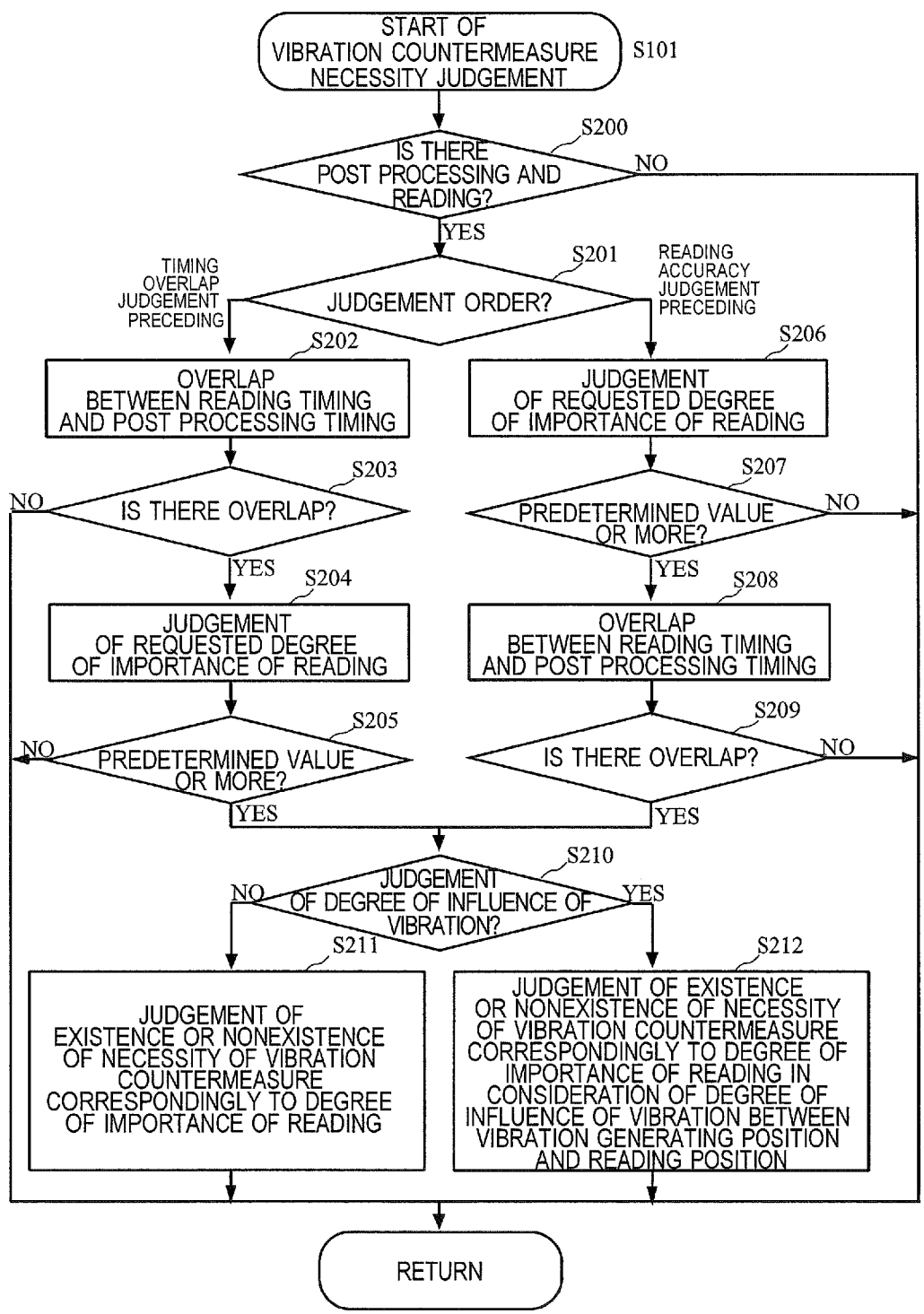
FIG. 6 is a flow chart showing operation according to one or more embodiments of the present invention.

The control section 101 checks whether an image formation job intended to be executed includes post processing, such as folding processing and stapling processing and whether the image formation job includes reading at the output matter reading apparatus 200 for sheet subjected to image formation at the image forming section 150 (Step S200 in FIG. 6).

The reading at the output matter reading apparatus 200 corresponds to various kinds of cases, such as a case of adjusting an image formation position and image quality by reading a chart, a case of finding an image formation failure sheet by comparing input image data with read image data, and a case of leaving an image formation result as an evidence (an image for confirming an evidence).

In the case where at least one of the post processing and the reading does not exist (NO at Step S200 in FIG. 6), reading failure (deterioration of a read image) due to vibration (post processing vibration) of post processing does not occur. Accordingly, it is judged that there is not the necessity of a vibration countermeasure, and the processing is ended (Return in FIG. 6). In the case where both the post processing and the reading exist together (YES at Step S200 in FIG. 6), there is a possibility that reading failure (deterioration of a read image) due to post processing vibration occurs. Accordingly, the control section 101 further continues the vibration countermeasure necessity judgment.

Herein, in one or more embodiments, two parameters of the following (a) and (b) are made as the standard of the vibration countermeasure necessity judgment.

(a) Existence or nonexistence of a timing overlap between an execution timing of reading at the output matter reading section 290 and a timing of generation of vibration in post processing at the post processing section 590a.

(b) The requested degree of importance of reading for reading of an image becoming a reading target.

In this case, in the case where a reading timing and a post processing timing do not overlap with each other, deterioration of the read image due to vibration does not occur. Accordingly, it is not necessary to perform a countermeasure for a timing overlap. On the other hand, even if a reading timing and a post processing timing overlap with each other, in the case of "the degree of importance of reading: low" in which the quality deterioration of a read image is not important, there may be case where a countermeasure for a timing overlap is not needed.

Further, the above (a) and the above (b) may be judged in parallel, and any one of them may be judged first. However, in the following situations, it becomes possible to reduce a load of processing by a judgment order. The above timing overlap judgment (the above (a)) becomes complicate processing necessary to consider a conveying speed of a sheet, the number of print sets, and the constitution of post processing. In contrast, the above degree of importance of reading (the above (b)) becomes simple processing, because the degree of importance of reading is determined by the setting of the degree of importance at the time of selecting an image during the reading and the setting of image resolution. Then, hereafter, description is given to a situation of a load of processing due to the judgment order of the above (a) and (b).

Judgment order (a) to (b):

Assumption is given to a case where there is no frequent post processing and two lane large stackers are used as a sheet delivery section after the post processing. In this case, when the number of print sets of sheets accumulates in one of the large stackers, it is necessary to switch to deliver sheets to another large stacker. At the time of the switching, vibration (post processing vibration) may occur. This switching is conducted with a frequency of one time for the sheet delivery of thousands of print sets. Accordingly, in many cases, image reading and post processing vibration do not overlap with each other. In such a case, at the time of image reading, in the case where the processing of (b) is performed first, the load of the processing is comparatively light. However, the power of CPU becomes useless slightly. In a certain image forming apparatus, images of "the degree of importance of reading: high" are read in many times. However, the use of the post processing apparatus 500 is little and the occurrence of an overlap between image reading and post processing vibration is little. In the above image forming apparatus, in order to perform the timing overlap judgment preferentially, it is better to perform the vibration countermeasure necessity judgment in the order of (a) to (b).

Judgment order (b) to (a):

Consideration is given to the following case. Post processing is performed frequently, and a timing overlap occurs between image reading and post processing vibration. However, all pages are set to "the degree of importance of reading: low" like a case of page omission detection. After having judged about (a) which is complicate processing, the judgment of the degree of importance of reading about (b) becomes "low". Accordingly, it is judged finally that vibration countermeasure is unnecessary. In this case, the power of CPU corresponding to (a) being complicate processing becomes useless. Then, in a certain image forming apparatus, images of "the degree of importance of reading: low" are printed in many cases. In the above image forming apparatus, in order to perform the judgment of the degree of importance of reading (the above (b)) preferentially, it is better to perform the vibration countermeasure necessity judgment in the order of (b) to (a).

With regard to the above-mentioned judgment order, correspondingly to the condition of the image forming system and the situation of the setting of an image formation job, the control section 101 determines an appropriate judgment order and performs it. Alternatively, it is possible for a user to set from the operation display section 103. In the case where both post processing and reading exist together (YES at Step S200 in FIG. 6) and a timing overlap judgment is performed antecedently ("timing overlap judgment antecedent" at Step S201 in FIG. 6), the control section 101 judges an overlap (timing overlap) between a timing to execute reading of a sheet at the output matter reading section 290 in the output matter reading apparatus 200 and a timing of generation of vibration (post processing vibration) generated at the time of executing post processing at the post processing section 590 (or the post processing section 590a) in the post processing apparatus 500 (Step S202 in FIG. 6).

In this case, the timing to execute reading of a sheet at the output matter reading section 290 in the output matter reading apparatus 200 is not a timing at which the whole of a sheet of a reading target exists at the reading position of the output matter reading section 290 and is set to a timing at which a reading target portion of a sheet of a reading target exists at the reading position of the output matter reading section 290.

Herein, as a reading target portion, in the case of reading the whole image, a case of reading a partial image (an image of a main part, a reference mark for positioning, a bar code, etc.) contained in the whole image may be considered. Further, the timing of generation of post processing vibration generated at the time of executing post processing is not a timing from a start to an end during the executing of the post processing, and is set to a timing at which vibration is generated actually, such as at the time of executing stabling and at the time of switching large stackers.

Then, in the case where it is judged by the timing overlap judgment that a timing overlap does not occur (NO at Step S203 in FIG. 6), the control section 101 judges such that there is not the necessity of a vibration countermeasure and ends the vibration countermeasure necessity judgment (Return in FIG. 6). On the other hand, in the case where it is judged by the timing overlap judgment that a timing overlap occurs (YES at Step S203 in FIG. 6), the control section 101 judges the degree of importance of reading required for an image to be read by the output matter reading section 290 (Step S204 in FIG. 6).

Herein, "the degree of importance of reading" is a value determined automatically, beforehand, or by a user in accordance with the intended use of an image of a reading target. Further, "the degree of importance of reading" is determined based on a read image resolution, an inverse number of an allowable error determined based on the size of the area of a reading target, and the like. Furthermore, it is preferable that the degree of importance of reading is classified into multiple stages of high, middle, and low based on predetermined standard values (threshold values) serving as comparison targets. For example, a read image resolution of 300 dpi or more is "the degree of importance of reading: high", a read image resolution of 100 to 299 dpi is "the degree of importance of reading: middle", and a read image resolution of 1 to 99 dpi is "the degree of importance of reading: low".

Moreover, it is preferable that, even in the case of the same read image resolution, in the case of the area of a reading target is large, the degree of importance of reading is set to "small"; in the case of the area of a reading target is middle, the degree of importance of reading is set to "middle"; and in the case of the area of a reading target is small, the degree of importance of reading is set to "large".

Figure 7:
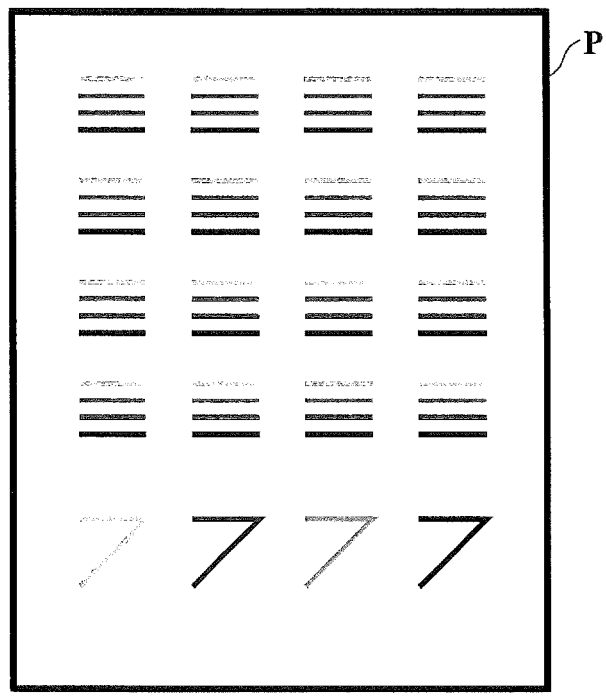
FIG. 7 is an explanatory drawing showing an example of a read image according to one or more embodiments of the present invention.
Figure 8:
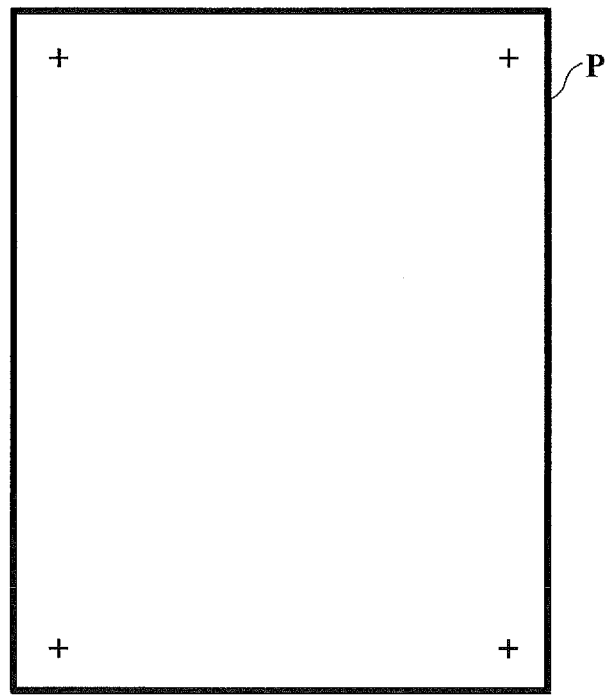
FIG. 8 is an explanatory drawing showing an example of a read image according to one or more embodiments of the present invention.

Specific examples of "the degree of importance of reading: high":

From the necessity of each of detection of an image formation position deviation and correction of an image formation position deviation, it is necessary to read correctly a resist patch (a line shown in FIG. 7, and a cross mark shown in FIG. 8) formed as an image on a sheet P in order to correct a deviation on an image formation position. For this reason, such an image is set to "the degree of importance of reading: high". In addition, patches important in terms of position, such as a patch and a cross mark, i.e., an intensity adjustment patch made to a thin line for process highest density adjustment and a cross mark for detection of image failure, correspond to "the degree of importance of reading: high".

Figure 9:
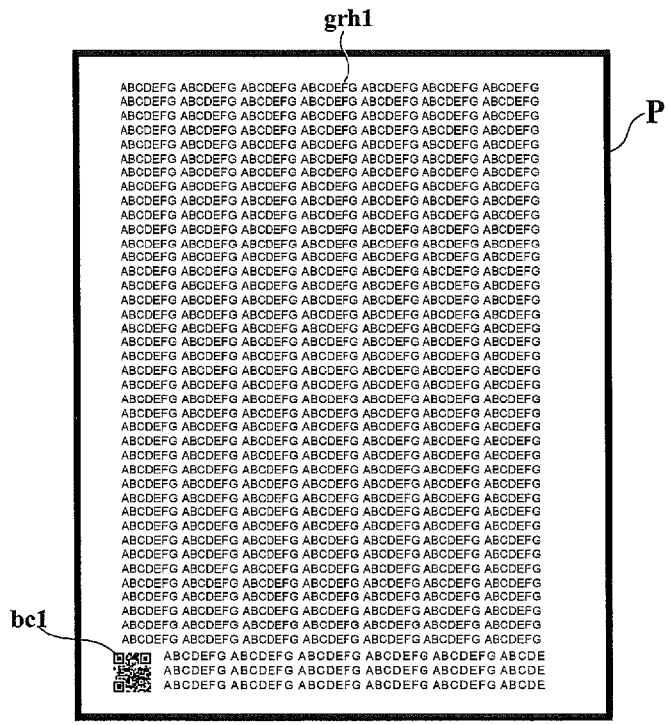
FIG. 9 is an explanatory drawing showing an example of a read image according to one or more embodiments of the present invention.
Figure 10:
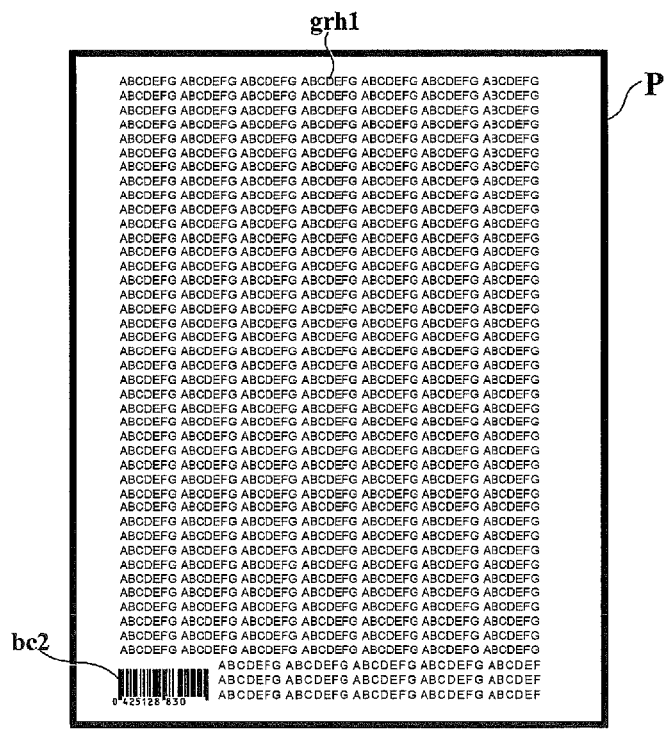
FIG. 10 is an explanatory drawing showing an example of a read image according to one or more embodiments of the present invention.

In the case where character recognition is executed for character images ("grh1" shown in FIG. 9 and FIG. 10) becoming a reading target, in order to execute character recognition correctly, such a character image corresponds to "the degree of importance of reading: high". In the case where analyzing is performed by reading a bar code ("bc1" shown in FIG. 9, and bc2 in FIG. 10) in an image, in order to analyze a bar code correctly without an error, such a bar code corresponds to "degree of importance of reading: high".

In the case where image analyzing is performed for a face photographic portion in an image for person identification and the like, in order to perform the image analyzing correctly, such a face photographic portion corresponds to "degree of importance of reading: high". In the case where a read image is used as quality examination of an output image, quality of the read image is requested. Accordingly, since it is necessary to avoid quality deterioration, such an image corresponds to "degree of importance of reading: high".

Figure 11:
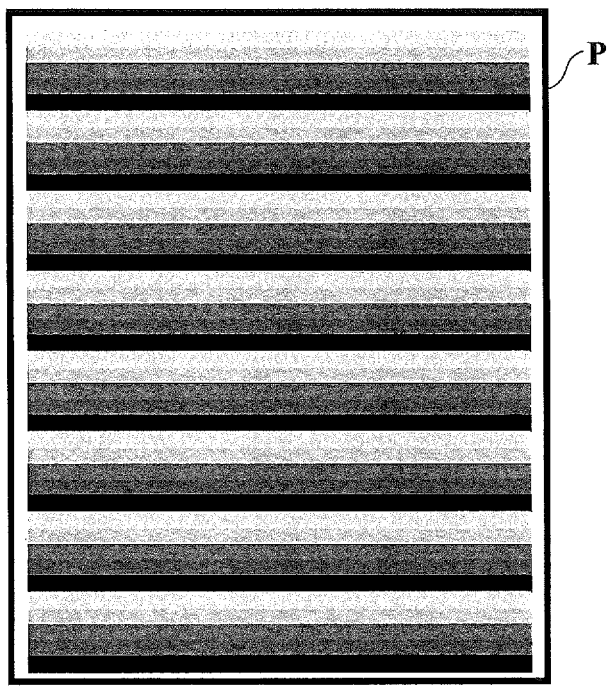
FIG. 11 is an explanatory drawing showing an example of a read image according to one or more embodiments of the present invention.

Specific examples of "the degree of importance of reading: middle":

A density balance adjustment patch (FIG. 11) which detects change and uniformity in density for a density balance in image formation is set to "the degree of importance of reading: middle". In the case where thumbnail images in a list of print pages are produced from read images, the read images are reduced in size. Accordingly, so high quality is not requested for reading. However, the image needs to have a quality with which the image can be recognized as an image. Therefore, such an image is set to "the degree of importance of reading: middle".

Figure 12:
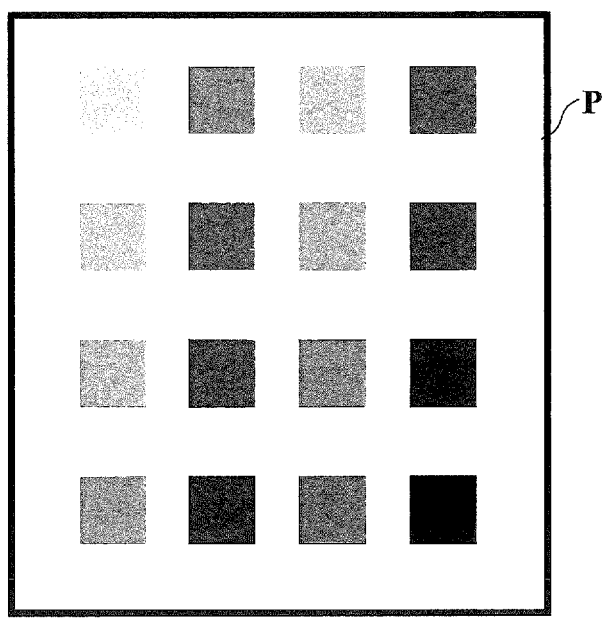
FIG. 12 is an explanatory drawing showing an example of a read image according to one or more embodiments of the present invention.

Specific examples of "the degree of importance of reading: low":

In density patch and color patch (FIG. 12) formed as images on a sheet P for image density correction and gradation correction, the area of each patch image is larger than a light receiving element. Accordingly, such an image is set to "the degree of importance of reading: low". In addition, a printer gamma sensor adjustment patch, a printer gamma offset adjustment patch, a color look-up table adjustment patch, a calibration patch and the like correspond to "the degree of importance of reading: low".

In the case where a read image is used for judgment of page omission etc., it is thought that even an image with deteriorated quality due to the incoming of vibration is sufficient for such judgment. Accordingly, such an image is set to "the degree of importance of reading: low". Then, in the case where the degree of importance of reading is less than a prescribed value (for example, "the degree of importance of reading: low") (NO at Step S205 in FIG. 6) by the judgment of the degree of importance of reading (Step S204 in FIG. 6), the control section 101 judges such that there is not the necessity for a vibration countermeasure, and ends the vibration countermeasure necessity judgment (Return in FIG. 6).

On the other hand, in the case where the degree of importance of reading is equal to or more than a prescribed value (for example, "the degree of importance of reading: middle" and "the degree of importance of reading: high") (YES at Step S205 in FIG. 6) by the judgment of the degree of importance of reading (Step S204 in FIG. 6), the control section 101 judges such that there is a possibility that there is the necessity for a vibration countermeasure. Accordingly, the control section 101 continues the processing in succession.

In the case where the degree of importance of reading is not determined automatically in accordance with the kind of images or the utilizing method of a read image as mentioned above, the control section 101 determines. Further, it is also possible for the control section 101 to determine the degree of importance of reading in accordance with time instead of the kind of images and the utilizing method of a read image. For example, in the morning or during a prescribed period of time after a power supply has been made ON, it is necessary to stabilize an image forming system. Accordingly, in the morning or within a prescribed period of time after a power supply has been made ON, it is possible to change an image with "the degree of importance of reading: middle" to the image with "the degree of importance of reading: high".

Figure 13:
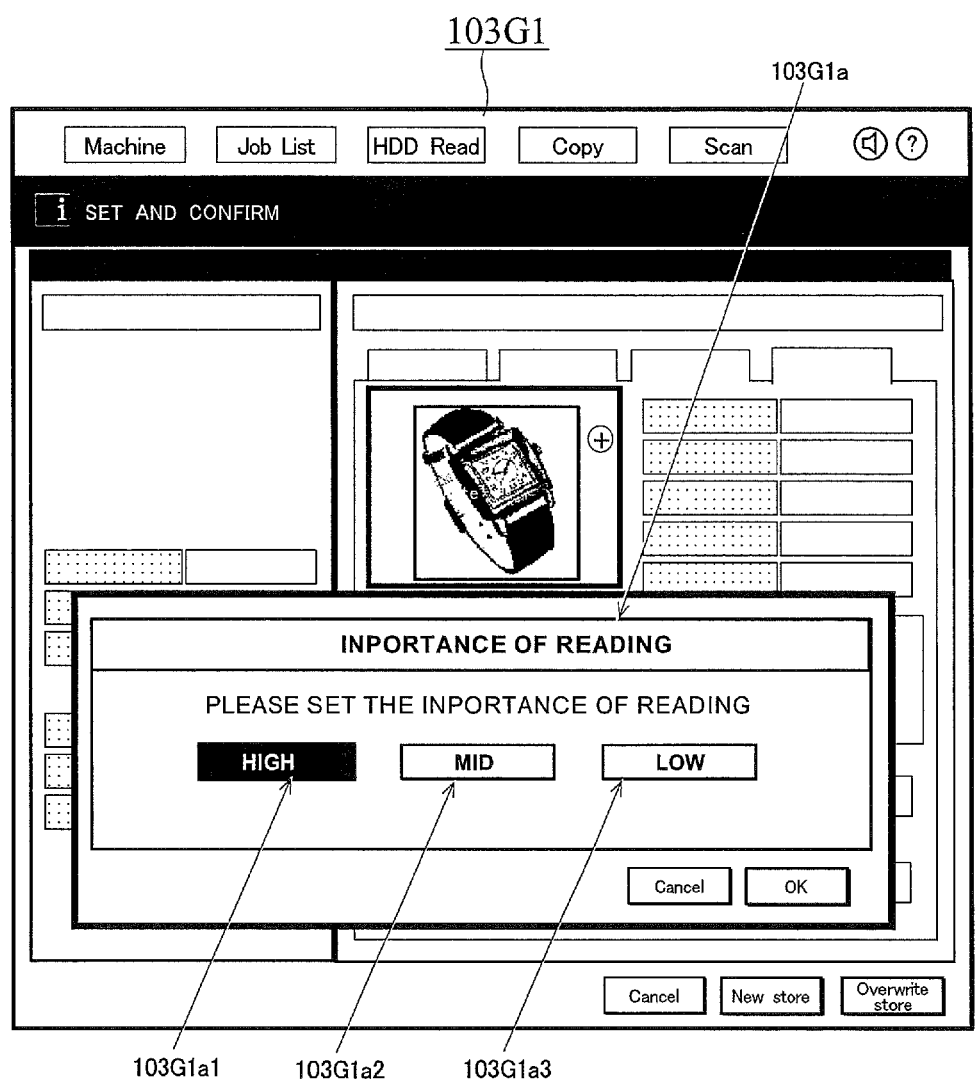
FIG. 13 is an explanatory drawing for describing setting on a display screen according to one or more embodiments of the present invention.

On the other hand, there may be a case where the control section 101 cannot determine, such as a case where an image is input from the outside. In such a case, the control section 101 displays a display screen 103G1 (refer to FIG. 13) on the operation display section 103, and on a pop-up screen 103G1*a* on the display screen 103G1, it is also possible to make a user input the degree of importance of reading. On the pop-up screen 103G1*a*, a selection item 103G1*a*1 of "degree of importance of reading: high", a selection item 103G1*a*2 of "degree of importance of reading: middle", and a selection item 103G1*a*3 of "degree of importance of reading: low" are indicated.

Further, with regard to the post processing vibration which occurs in the post processing section 590, the control section 101 considers a possibility that vibration amplitude may change before the post processing vibration reaches the output matter reading section 290. For example, in the case of an image forming system with the constitution shown in FIG. 1 and FIG. 2, the post processing vibration, which occurs in the post processing section 590, reaches the output matter reading section 290 in a fixed state. In this case, the degree of influence of vibration is constant. Accordingly (NO at Step S210 in FIG. 6), the vibration countermeasure necessity judgment is executed in accordance with the degree of importance of reading mentioned above (Step S211 in FIG. 6).

Here, the control section 101 executes the vibration countermeasure necessity judgment in accordance with a judgment table as shown in FIG. 14. Herein, in the case where a timing overlap does not occur, it is judged that the vibration countermeasure necessity is "unnecessary". Further, in the case where a timing overlap occurs, and in the case of "the degree of importance of reading: high" or in the case of "the degree of importance of reading: middle"; it is judged that the vibration countermeasure necessity is "necessary". Furthermore, in the case where a timing overlap occurs, and in the case of "the degree of importance of reading: low"; it is judged that the vibration countermeasure necessity is "unnecessary".

Moreover, in an image forming system with the constitution shown in FIG. 3 and FIG. 4, depending on the size and strength of the intermediate processing apparatus 400 to be used, the vibration amplitude reaching the output matter reading section 290 from the post processing section 590 may change. That is, vibration having occurred in the post processing section 590 may attenuate at the time of passing the intermediate processing apparatus 400, and its amplitude may become small at the output matter reading section 290. In this case, since the degree of influence of vibration changes (YES at Step S210 in FIG. 6), the vibration countermeasure necessity judgment is executed in accordance with the degree of importance of reading and the degree of influence of vibration mentioned above (Step S212 in FIG. 6).

For example, in the case where the intermediate processing apparatus 400 is a small type, the vibration amplitude reaching the output matter reading section 290 seldom attenuates. Accordingly, such a case is set to "the degree of influence of vibration: large". Further, in the case where the intermediate processing apparatus 400 is a middle type, the vibration amplitude reaching the output matter reading section 290 attenuates slightly. Accordingly, such a case is set to "the degree of influence of vibration: middle". Further, in the case where the intermediate processing apparatus 400 is a large type and strong, the vibration amplitude reaching the output matter reading section 290 attenuates greatly. Accordingly, such a case is made to "the degree of influence of vibration: small". Incidentally, the small type, the middle type, and the large type in the intermediate processing apparatus 400 may be judged relatively depending on the magnitude of occurring vibration, the size of the post processing apparatus 500, and the like.

Here, the control section 101 judges whether a vibration countermeasure is needed or not, in accordance with a judgment table shown in FIG. 15. Herein, in the case where a timing overlap does not occur, it judged that the vibration countermeasure necessity is "unnecessary". Further, in the case where a timing overlap occurs, in accordance with "the degree of importance of reading: high, middle, or low" and "the degree of influence of vibration: large, middle, or small", the control section 101 judges "necessary" or "unnecessary" in the vibration countermeasure necessity judgment.

In the case where a timing overlap occurs, in the case of "the degree of influence of vibration: large or middle", and in the case of "the degree of importance of reading: high" or in the case of "the degree of importance of reading: middle"; it is judged that the vibration countermeasure necessity is "necessary". Further, in the case where a timing overlap occurs, in the case of "the degree of influence of vibration: large or middle", and in the case of "the degree of importance of reading: low"; it is judged that the vibration countermeasure necessity is "unnecessary". Furthermore, in the case where a timing overlap occurs, in the case of "the degree of influence of vibration: small", and in the case of "the degree of importance of reading: any one of high to low"; it is judged that the vibration countermeasure necessity is "unnecessary".

In this way, by performing the vibration countermeasure necessity judgment, it becomes possible to judge, in the case of actually needed, such that a vibration countermeasure is necessary. As a result, it becomes possible to avoid the lowering of productivity due to a useless vibration countermeasure. As described in the above, before the image &mining apparatus 100 starts an image formation job, the control section 101 executes the vibration countermeasure necessity judgment (Step S101 in FIG. 5).

In the case where it is judged by the above vibration countermeasure necessity judgment that a countermeasure is "unnecessary" (NO at Step S102 in FIG. 5), the control section 101 executes reading (Step S104 in FIG. 5) by the output matter reading section 290 and post processing (Step S105 in FIG. 5) by the post processing apparatus 500 in association with image formation without executing a special vibration countermeasure control.

Successively, until a processed page becomes the final page of the image formation job, the above processing is performed repeatedly (Step S106 in FIG. 5). In the case where it is judged by the above vibration countermeasure necessity judgment that a countermeasure is "necessary" (YES at Step S102 in FIG. 5), the control section 101 executes reading by the output matter reading section 290 and post processing by the post processing apparatus 500 in association with image formation while executing the vibration countermeasure control described below (Step S103 in FIG. 5).

Successively, until a processed page becomes the final page of the image formation job, the above processing is performed repeatedly (Step S106 in FIG. 5).

Here, with reference to a flow chart shown in FIG. 16, description is given in detail to processing (Step S103 in FIG. 5) which executes reading and post processing while executing the vibration countermeasure control.

First, when reading is going to be executed for sheets subjected to image formation in the m-th print set, the control section 101 judges whether post processing is being executed for sheets in the (m−1)-th print set preceding the m-th print set (Step S301 in FIG. 16). In the case where post processing is not being executed for sheets in the (m−1)-th print set preceding the m-th print set (NO at Step S301 in FIG. 16), the control section 101 execute reading by the output matter reading section 290 for sheets subjected to image formation in the m-th print set (Step S302 in FIG. 16). Herein, during the execution of reading, it is preferable that the control section 101 stands a flag showing "during execution of reading" and uses it for a during-execution judgment mentioned later ("during-execution flag" indicated with a broken line at Step S302 to S303 in FIG. 16).

Herein, the control section 101 supervises whether reading by the output matter reading section 290 is completed (Step S303 in FIG. 16). Then, at a time point when reading by the output matter reading section 290 has been completed (YES at Step S303 in FIG. 16), the control section 101 executes post processing for the m-th print set (Step S304 in FIG. 16). Incidentally, the execution of the post processing at this step S304 means an action which generates vibration in post processing. That is, actions immediately before vibration is generated, such as matching or loading of sheets, may be executed in parallel to reading by the output matter reading section 290.

By executing as mentioned in the above, in the case where a countermeasure is needed, as a vibration countermeasure control, during of operation of one process, operation of another process is stopped. Thereby, it becomes possible to execute post processing and reading efficiently. On the other hand, in the case where post processing for sheets of the (m−1)-th print set preceding the m-th print set is being executed (YES at Step S301 in FIG. 16), the control section 101 waits for the completion of the execution of the post processing for sheets of the (m−1)-th print set (Steps S305 and S306 in FIG. 16). Herein, during the execution of post processing, it is preferable that the control section 101 stands a flag showing "during execution of post processing" and uses it for a during-execution judgment ("during-execution flag" indicated with a broken line at Step S305 to S306 in FIG. 16).

In the case where the post processing for sheets of the preceding (m−1)-th print set has been completed (YES at Step S306 in FIG. 16), the control section 101 executes reading by the output matter reading section 290 for sheets subjected to image formation in the m-th print set (Step S307 in FIG. 16). Herein, during the execution of reading, it is preferable that the control section 101 stands a flag showing "during execution of reading" and uses it for a during-execution judgment mentioned later ("during-execution flag" indicated with a broken line at Step S307 to S308 in FIG. 16).

Herein, the control section 101 supervises whether reading by the output matter reading section 290 for the m-th print set is completed (Step S308 in FIG. 16). Then, at a time point when reading by the output matter reading section 290 for the m-th print set has been completed (YES at Step S308 in FIG. 16), the control section 101 executes post processing for the m-th print set (Step S309 in FIG. 16). Incidentally, the execution of the post processing at this step S309 means an action which generates vibration in post processing. That is, actions immediately before vibration is generated, such as matching or loading of sheets, may be executed in parallel to reading by the output matter reading section 290.

Herein, during the execution of the post processing for the m-th print set, it is preferable that the control section 101 stands a flag showing "during execution of post processing" and uses it for a post processing during-execution judgment ("during-execution flag" indicated with a broken line at Step S309 to S301 in FIG. 16) at the time of starting reading for the next (m+1)-th print set. By executing as mentioned in the above, in the case where a countermeasure is needed, as a vibration countermeasure control, during of operation of one process, operation of another process is stopped. Thereby, it becomes possible to execute post processing and reading efficiently.

[C] Specific Example:

Hereinafter, respective arrangements of sheets are shown in the side view of an image forming system in FIG. 17 and the following drawings, and specific examples of a timing overlap and a vibration countermeasure control are shown.

Figure 17:
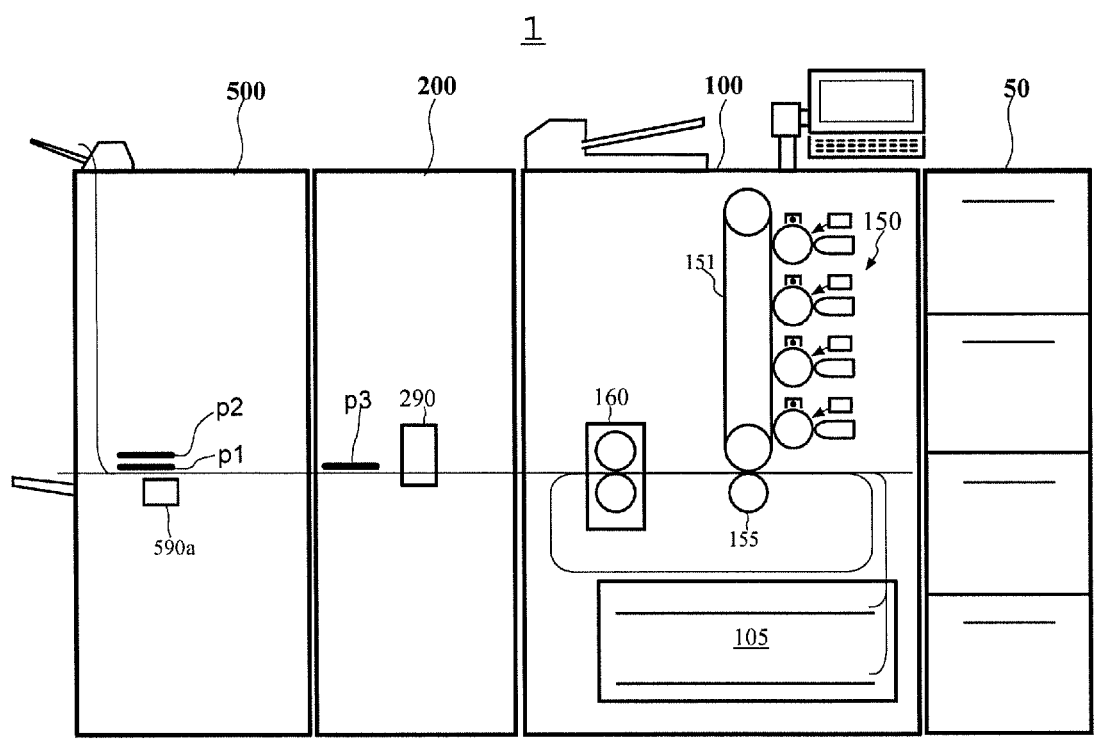
FIG. 17 is an explanatory drawing showing an operating state according to one or more embodiments of the present invention.

[C-1] Specific Example (1):

FIG. 17 shows a case where the number of pages per one print set is set to 3, the number of print sets is set to 1, post processing (stapling) is set to be executed for the first page and the second page, and reading is set to be executed for all pages.

Here, at the time of execution of stapling, the first page sheet and the second page sheet (p1 and p2) have reached the post processing section 590*a*, and the last third page sheet (p3) have passed the output matter reading section 290. Further, since there is no following print set, there is no possibility that vibration at the time of post processing influences an image at the time of image reading. Accordingly, this case is in a state where "a reading timing and a post processing timing do not overlap with each other". Therefore, the vibration countermeasure necessity judgment judges such that a vibration countermeasure is "unnecessary".

Figure 18:
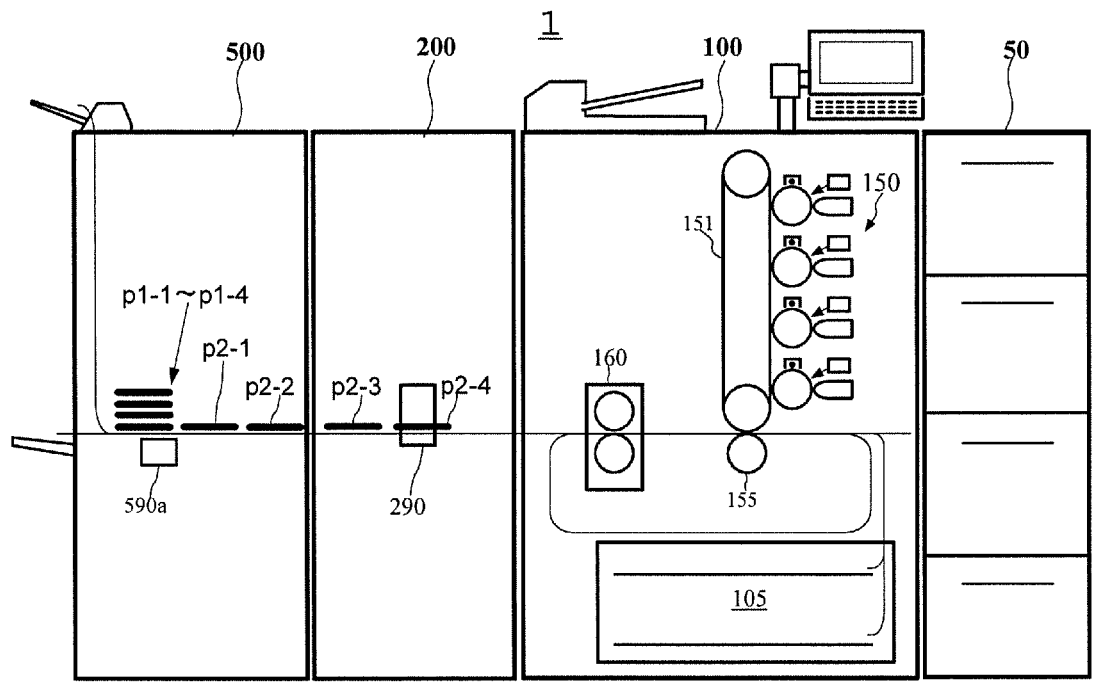
FIG. 18 is an explanatory drawing showing an operating state according to one or more embodiments of the present invention.

[C-2] Specific Example (2):

FIG. 18 shows a case where the number of pages per one print set is set to 4, the number of print sets is set to 2, post processing (stapling) is set to be executed for all pages, and reading is set to be executed for only the first page of each print set. In this case, in the sheets to be read in a print set, the leading sheet and the second sheet have passed at a staple timing. However, in this case, if the number of pages in a print set is small, there is a possibility that a sheet being a reading targets in the following print set coincides with the staple timing of the preceding print set.

Herein, in a state shown in FIG. 18, a sheet (p2-1) of the first page being a reading target in the second print set has passed the output matter reading section 290 at the time of stapling of the preceding first print set. Accordingly, this state is a state where "a reading timing and a post processing timing do not overlap with each other". Therefore, the vibration countermeasure necessity judgment judges such that a vibration countermeasure is "unnecessary".

Figure 19:
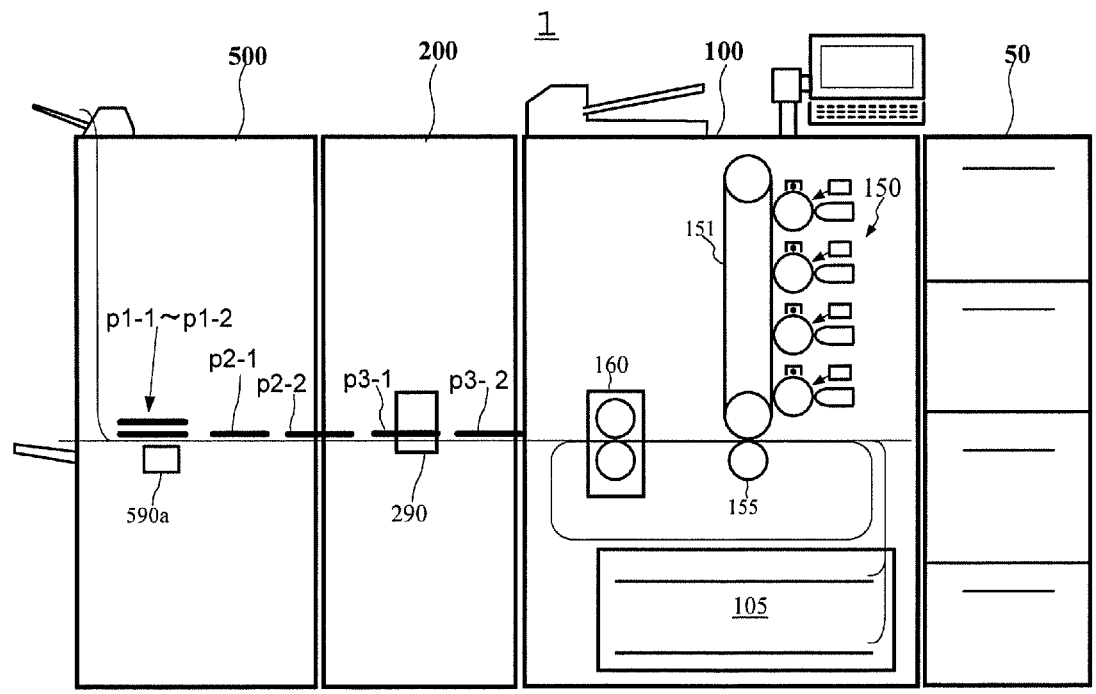
FIG. 19 is an explanatory drawing showing an operating state according to one or more embodiments of the present invention.

[C-3] Specific Example (3):

FIG. 19 shows a case where the number of pages per one print set is set to 2, the number of print sets is set to 3, post processing (stapling) is set to be executed for all pages, and reading is set to be executed for only the first page of each print set. In this case, a sheet (p1-1) being a reading target in the print set and a sheet (p2-1) being a reading target in the following print set have passed at the time of stapling of the first print set. However, in this case, if the number of pages in a print set is small, there is a possibility that a sheet being a reading targets in the further following print set (the third print set, the fourth print set, * * * ) coincides with the staple timing of the preceding print set.

Herein, in a state shown in FIG. 19, a sheet (p2-1) of the first page being a reading target in the second print set has passed the output matter reading section 290 at the time of stapling of the preceding first print set. On the other hand, in a state shown in FIG. 19, a sheet (p3-1) of the first page being a reading target in the third print set becomes during reading at the output matter reading section 290 at the time of stapling of the first print set. Accordingly, this state is a state where "a reading timing and a post processing timing overlap with each other". Therefore, the vibration countermeasure necessity judgment judges such that a vibration countermeasure is "necessary".

Figure 20:
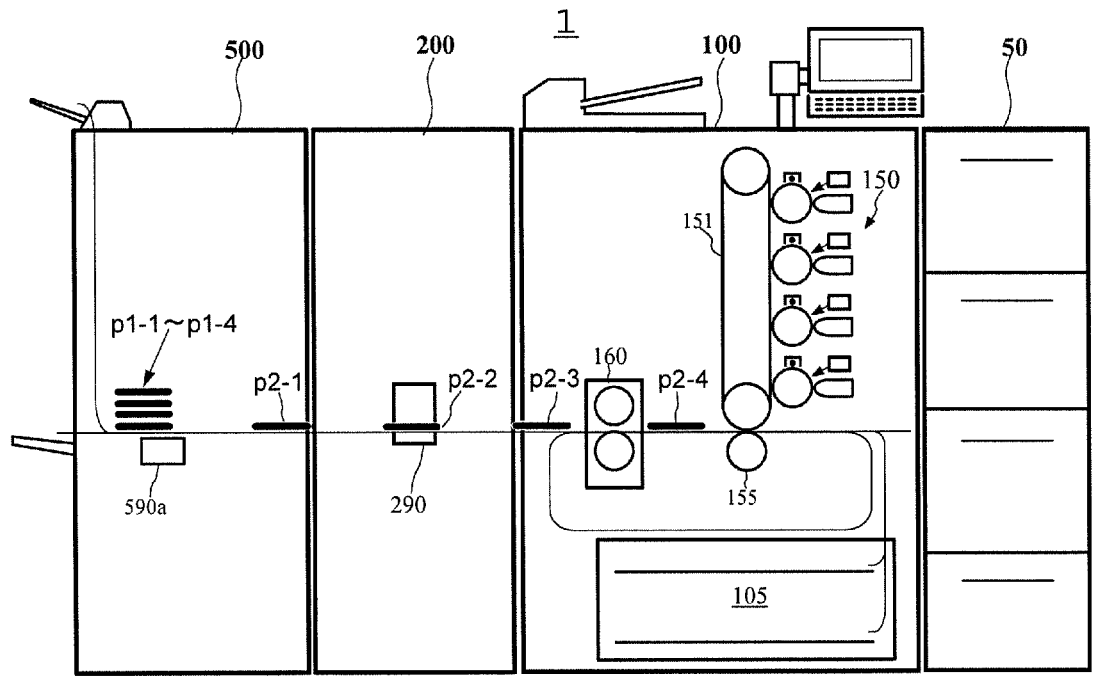
FIG. 20 is an explanatory drawing showing an operating state according to one or more embodiments of the present invention.

[C-4] Specific Example (4):

FIG. 20 shows a case where the number of pages per one print set is set to 4, the number of print sets is set to 3, post processing (stapling) is set to be executed for all pages, and reading is set to be executed for all pages. Herein, in a state shown in FIG. 20, at the time of executing stapling for the preceding first print set (p1-1 to p1-4), a sheet (p2-2) of the second page being a reading target in the second print set becomes during reading at the output matter reading section 290. Accordingly, this state is a state where "a reading timing and a post processing timing overlap with each other". Therefore, the vibration countermeasure necessity judgment judges such that a vibration countermeasure is "necessary".

Figure 21:
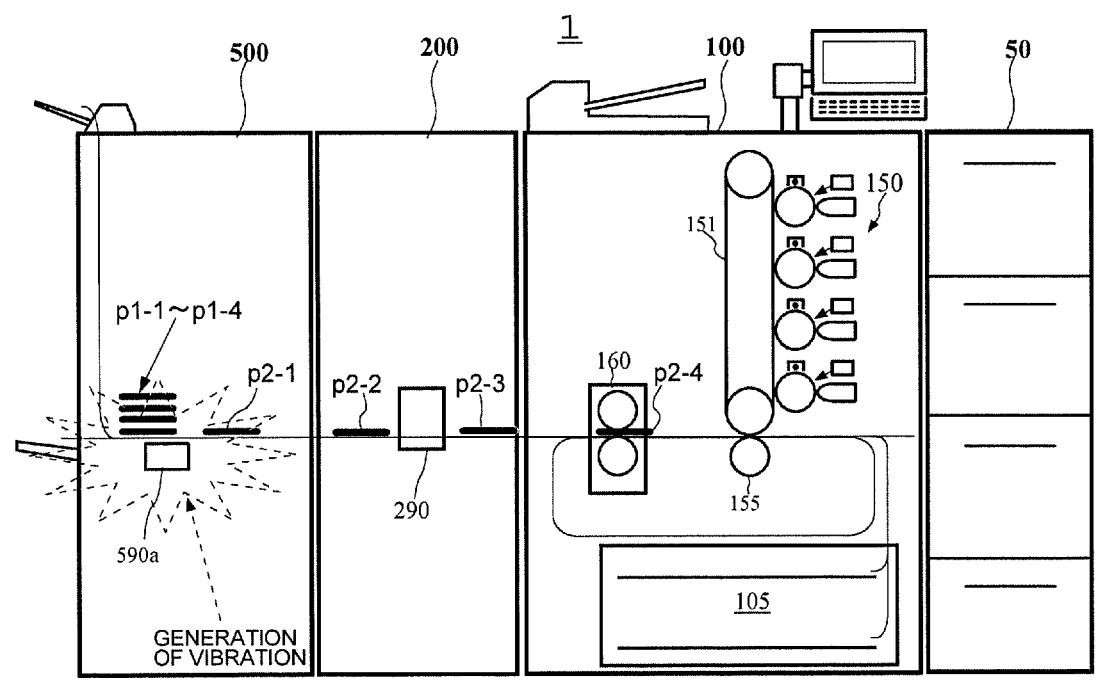
FIG. 21 is an explanatory drawing showing an operating state according to one or more embodiments of the present invention.

Accordingly, until reading for a sheet (p2-2) of the second page being a reading target in the second print set is completed, the control section 101 waits without executing stapling for the first print set (p1-1 to p1-4). Then, in a period between sheets after reading for a sheet (p2-2) of the second page being a reading target in the second print set has been completed before reading for a sheet (p2-3) of the third page being a reading target in the second print set is started, as shown in FIG. 21, stapling for the first print set (p1-1 to p1-4) is executed ("generation of vibration" in FIG. 21).

As a vibration countermeasure control to keep an overlap from occurring, the staple operation which generates vibration does not need to be executed between sheets each being a reading target and may be executed to avoid an image to be read (for example, a patch region). As described in the above, by the execution of the vibration countermeasure control, post processing, such as stapling, is made to wait during a period of reading at the output matter reading section 290. In this case, neither waiting nor stopping occurs for image formation or reading of output matter. Accordingly, there is an advantage that the lowering of productivity is small. Therefore, the technique may become an effective technique at the time of handling the large number of print sets with the small number of pages. Incidentally, in the case where post processing cannot be completed in a period between sheets, the technique of the following Example (5) becomes effective.

Figure 22:
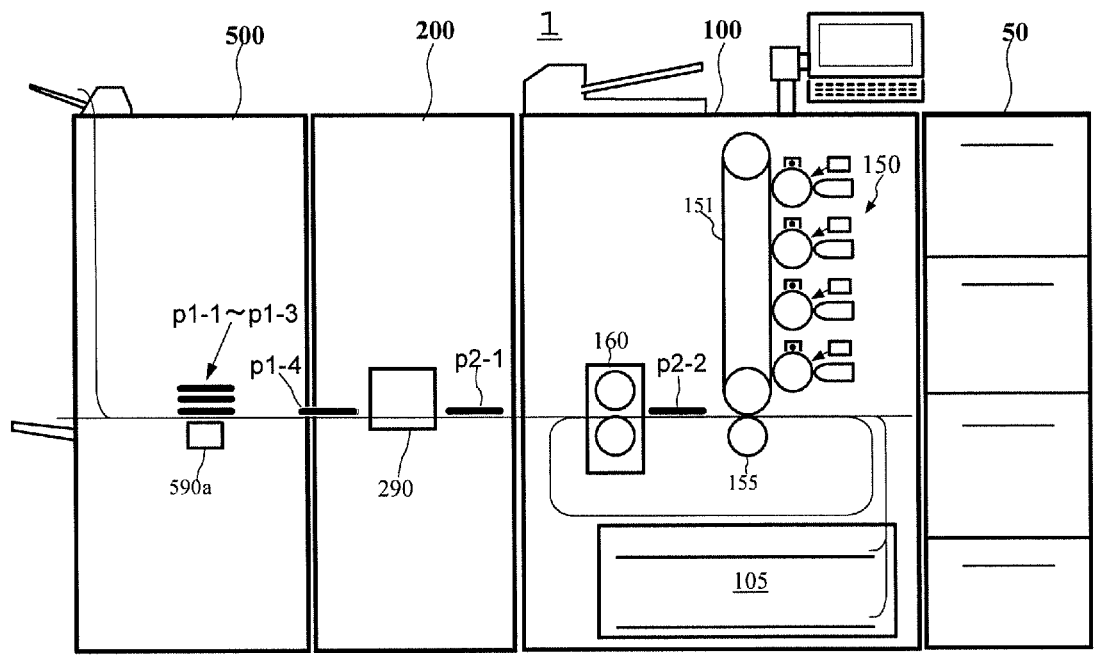
FIG. 22 is an explanatory drawing showing an operating state according to one or more embodiments of the present invention.

[C-5] Specific Example (5):

FIG. 22 shows a case where the number of pages per one print set is set to 4, the number of print sets is set to 3, post processing (stapling) is set to be executed for all pages, and reading is set to be executed for all pages. Herein, in a state shown in FIG. 22, reading for a sheet (p1-4) of the last page in the first print set at the output matter reading section 290 has been completed and reading for a sheet (p2-1) of the first page in the second print set at the output matter reading section 290 is made just before starting. In this case, at the time of executing stapling for the first print set (p1-1 to p1-4), a stapling timing and a reading timing, for any one of pages of the second print set, overlaps with each other.

Figure 23:
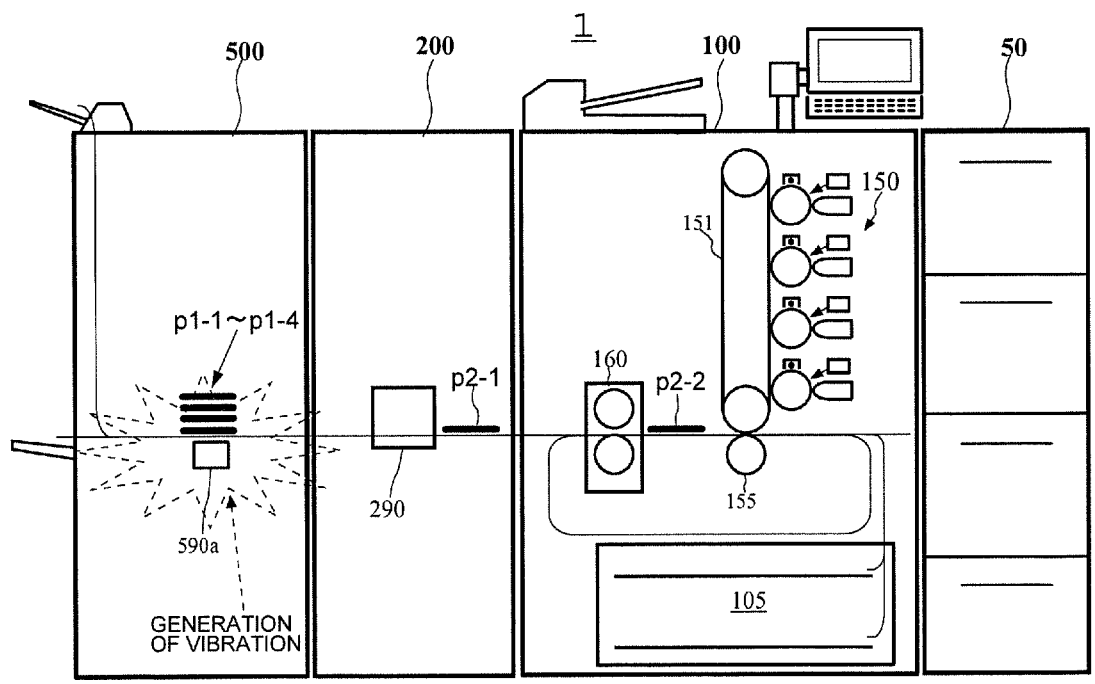
FIG. 23 is an explanatory drawing showing an operating state according to one or more embodiments of the present invention.

Then, as shown in FIG. 23, a reading timing is adjusted to be delayed such that reading for the first page in the second print set is started after stapling ("generation of vibration" in FIG. 23) for the first print set (p1-1 to p1-4) has been completed. In order to delay a reading timing for the first page in the second print set, it is possible to use various techniques, such as a technique to delay a start timing of sheet feeding and image formation for the second print set from the original timing (a state in FIG. 22), and a technique to stop a sheet conveying timing for the second print set temporarily.

As described in the above, by the execution of the vibration countermeasure control, a reading timing at the output matter reading section 290 is made to wait temporarily. In such a case, waiting or stopping occurs slightly for image formation and reading of output matter. However, there is an advantage that it becomes possible to cope with even such post processing which takes time which exceeds time needed between sheets.

Other Constitutional Examples and Operational Examples

The constitution of the image forming apparatus and image forming system shown in FIG. 1 to FIG. 4 is one example for describing operation and control in the present embodiment. Therefore, the present embodiment should not be limited to what are illustrated in the above description. That is, all of image forming apparatuses and image forming systems which can be applied with the above-mentioned image formation control method are included in the present embodiment.

Further, the above description shows an example where the degree of importance of reading is classified into three degrees. However, it may be classified into two degrees or four or more degrees. Similarly, the above description shows an example where the degree of influence of vibration is classified into three degrees. However, it may be classified into two degrees or four or more degrees.

Effects Acquired by One or More Embodiments

In an image forming apparatus 100 or image forming system 1 to which one or more embodiment are reflected, the degree of importance of reading about a reading target is judged, existence or nonexistence of an overlap between an execution timing of reading and a vibration generating timing in post processing is judged, the necessity of a countermeasure not to cause the overlap is judged with reference to the degree of importance and the existence or nonexistence of an overlap, and reading and post processing are controlled such that an overlap does not occur correspondingly to the judged necessity of a countermeasure. In this case, with regard to reading and post processing, since a technique is not configured such that if one process is being executed, another process is stopped evenly. Accordingly, productivity lowers evenly does not occur.

That is, the necessity of a countermeasure is judged based on the degree of importance of reading and the existence or nonexistence of an overlap between execution timings. Accordingly, in the case where a countermeasure for vibration is unnecessary, even if one process is being executed, operation of another process is not stopped. Further, in the case where a countermeasure for vibration is necessary by the judgment, as a vibration countermeasure control, when one process is being executed, operation of another process is stopped. Accordingly, in an image forming apparatus and image forming system that are equipped with a post processing apparatus and a reading section, it becomes possible to execute post processing and reading efficiently.

In one or more embodiments described above, whether a timing to read a portion of a reading target by a reading section and a timing to generate vibration by applying post processing for a sheet by a post processing section overlap with each other or not is judged, and in the case where an overlap does not occur, it is judged that there is not the necessity of a countermeasure. Accordingly, in the case where a countermeasure for vibration is unnecessary, even if one process is being executed, operation of another process is not stopped. Further, in the judgment, in the case where a countermeasure for vibration is necessary, as a vibration countermeasure control, when one process is being executed, operation of another process is stopped. Accordingly, in an image forming apparatus and image forming system that are equipped with a post processing apparatus and a reading section, it becomes possible to execute post processing and reading efficiently.

In one or more embodiments described above, in the case where an overlap occurs, further, in the case where the degree of importance of reading is higher than a predetermined value, it is judged that there is the necessity of a countermeasure, and in the case where the degree of importance of reading is lower than a predetermined value, it is judged that there is not the necessity of a countermeasure. Accordingly, in a situation where reading tends to receive the influence by vibration of post processing and a countermeasure is needed, control of the countermeasure is executed. Further, in a situation where reading is difficult to receive the influence by vibration of post processing and a countermeasure is not needed, control of the countermeasure is not executed. With this, in an image forming apparatus and image forming system which are equipped with a post processing apparatus and a reading section, it becomes possible to execute post processing and reading efficiently.

In one or more embodiments described above, in the case where an image is read by a reading section and recognition or analysis of the image is executed, the required degree of importance of reading is handled as being higher than a predetermined value, and it is judged that there is the necessity of a countermeasure. Accordingly, in a situation where reading tends to receive the influence by vibration of post processing and a countermeasure is needed, control of the countermeasure is executed. With this, in an image forming apparatus and image forming system which are equipped with a post processing apparatus and a reading section, it becomes possible to execute post processing and reading efficiently.

In one or more embodiments described above, in the case where an overlap occurs, further, in the case where the degree of importance of reading is higher than a predetermined value, it is judged that there is the necessity of a countermeasure, and in the case where the degree of importance of reading is lower than a predetermined value, it is judged that there is not the necessity of a countermeasure. In addition, the degree of importance of reading is enabled to be set and to change the setting. Accordingly, in a situation where reading tends to receive the influence by vibration of post processing and a countermeasure is needed, control of the countermeasure is executed. Further, in a situation where reading is difficult to receive the influence by vibration of post processing and a countermeasure is not needed, control of the countermeasure is not executed. With this, in an image forming apparatus and image forming system which are equipped with a post processing apparatus and a reading section, it becomes possible to execute post processing and reading efficiently.

In one or more embodiments described above, at the time of judging the necessity for a countermeasure to keep an overlap from occurring, the degree of influence of vibration between a post processing section and a reading section is referred. Accordingly, in a situation where reading tends to receive the influence by vibration of post processing and a countermeasure is needed, control of the countermeasure is executed. Further, in a situation where reading is difficult to receive the influence by vibration of post processing and a countermeasure is not needed, control of the countermeasure is not executed. With this, in an image forming apparatus and image forming system which are equipped with a post processing apparatus and a reading section, it becomes possible to execute post processing and reading efficiently.

In one or more embodiments described above, as the countermeasure to keep the overlap from occurring, the post processing of a post processing section is controlled such that the post processing is executed in a period other than a timing to execute reading. With this, in an image forming apparatus and image forming system which are equipped with a post processing apparatus and a reading section, it becomes possible to execute post processing and reading efficiently.

In one or more embodiments described above, as the countermeasure to keep the overlap from occurring, the reading of the reading section is controlled such that the reading is executed in a period other than a timing to execute post processing. With this, in an image forming apparatus and image forming system which are equipped with a post processing apparatus and a reading section, it becomes possible to execute post processing and reading efficiently.

In one or more embodiments described above, as the countermeasure to keep the overlap from occurring, the reading of the reading section and the post processing of the post processing section are controlled such that the post processing is executed after the reading has been completed. With this, in an image forming apparatus and image forming system which are equipped with a post processing apparatus and a reading section, it becomes possible to execute post processing and reading efficiently.

In one or more embodiments described above, as the countermeasure to keep the overlap from occurring, the reading of the reading section and the post processing of the post processing section are controlled such that the reading is executed after the post processing has been completed. With this, in an image forming apparatus and image forming system which are equipped with a post processing apparatus and a reading section, it becomes possible to execute post processing and reading efficiently.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus, comprising:
    an image former that executes image formation for a document or a sheet, and that connects to a post processor that applies post processing to the document or the sheet;
    a reader that reads the document or the sheet; and
    a controller that:
        controls the image formation, the reading, and the post processing;
        judges a requested degree of importance of reading for a reading target on the document or the sheet;
        judges existence or nonexistence of an overlap between an execution timing of the reading and a timing of generation of vibration in the post processing;
        judges a necessity of a countermeasure to prevent the overlap from occurring with reference to the degree of importance of reading and the existence or nonexistence of the overlap; and
        controls the execution timing of the reading and the post processing to prevent the overlap from occurring when the controller determines that the countermeasure is necessary,
    wherein the reading target on the document or the sheet is a partial portion of the an image formed on the document or the sheet, and
    wherein the controller judges whether a timing of reading the partial portion of the image formed on the document or sheet with the reading target by the reader and the timing of generation of vibration in the post processing overlap with each other, and determines that the countermeasure is not necessary when the overlap does not exist.

2. The image forming apparatus according to claim 1, wherein
    when the controller determines that the overlap exists, and that the degree of importance of reading is higher than a predetermined value, the controller determines that the countermeasure is necessary, and
    when the controller determines that the overlap exists, and that the degree of importance of reading is lower than the predetermined value, the controller determines that the countermeasure is not necessary.

3. The image forming apparatus according to claim 2, wherein when recognition or analysis of the reading is executed, the controller determines that the required degree of importance of reading is higher than the predetermined value.

4. The image forming apparatus according to claim 2, wherein the controller sets the requested degree of importance of reading or changes setting of the requested degree of importance of reading.

5. The image forming apparatus according to claim 1, wherein when the controller judges the necessity of the countermeasure to prevent the overlap from occurring, the controller refers a degree of influence of vibration between the post processor and the reader.

6. The image forming apparatus according to claim 1, wherein as the countermeasure to prevent the overlap from occurring, the controller controls the post processing so that the post processing is executed in a period other than the execution timing of the reading.

7. The image forming apparatus according to claim 1, wherein as the countermeasure to prevent the overlap from occurring, the controller controls the reading so that the reading is executed in a period other than an execution timing of the post processing.

8. The image forming apparatus described in claim 1, wherein as the countermeasure to prevent the overlap from occurring, the controller controls the reading and the post processing so that the post processing is executed after the reading has been completed.

9. The image forming apparatus described in claim 1, wherein as the countermeasure to prevent the overlap from occurring, the controller controls the reading and the post processing so that the reading is executed after the post processing has been completed.

10. An image forming system, comprising:
    an image former that executes image formation for a document or a sheet;
    a reader that reads the document or the sheet;
    a post processor that applies post processing to the document or the sheet; and
    a controller that:
        controls the image formation, the reading, and the post processing;
        judges a requested degree of importance of reading for a reading target on the document or the sheet;
        judges existence or nonexistence of an overlap between an execution timing of the reading and a timing of generation of vibration in the post processing;
        judges a necessity of a countermeasure to prevent the overlap from occurring with reference to the degree of importance of reading and the existence or nonexistence of the overlap; and
        controls the execution timing of the reading and the post processing to prevent the overlap from occurring when the controller determine that the countermeasure is necessary,
    wherein the reading target on the document or the sheet is a partial portion of the an image formed on the document or the sheet, and
    wherein the controller judges whether a timing of reading the partial portion of the image formed on the document or sheet with the reading target by the reader and the timing of generation of vibration in the post processing overlap with each other, and determines that the countermeasure is not necessary when the overlap does not exist, and
    wherein the image former, the reader, the post processor, and the controller are connected.

11. An image formation control method for controlling a system comprising an image former that executes image formation for a document or a sheet, a reader that reads the document or the sheet, and a post processor that applies post processing to the document or the sheet, the image formation control method comprises:
    controlling the image formation, the reading, and the post processing;

judging a requested degree of importance of reading for a reading target on the document or the sheet;

judging existence or nonexistence of an overlap between an execution timing of the reading and a timing of generation of vibration in the post processing;

judging a necessity of a countermeasure to prevent the overlap from occurring with reference to the degree of importance of reading and the existence or nonexistence of the overlap;

controlling an execution timing of the reading and the post processing to prevent the overlap from occurring when there is the necessity of the countermeasure in the judging the necessity of the countermeasure;

judging whether a timing of reading a partial portion of an image formed on the document or sheet with the reading target by the reader and the timing of generation of vibration in the post processing overlap with each other; and determining that the countermeasure is not necessary when the overlap does not exist, wherein the reading target on the document or the sheet is the partial portion of the image formed on the document or the sheet.

* * * * *